(12) United States Patent
Han et al.

(10) Patent No.: US 10,966,284 B2
(45) Date of Patent: *Mar. 30, 2021

(54) FLEXIBLE FLOW CONTROL MECHANISM FOR NG-RAN INTERFACES

(71) Applicant: Apple Inc., Cupertino, CA (US)

(72) Inventors: Jaemin Han, Hillsboro, OR (US); Alexander Sirotkin, Tel-Aviv (IL)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/859,673

(22) Filed: Apr. 27, 2020

(65) Prior Publication Data

US 2020/0314963 A1 Oct. 1, 2020

Related U.S. Application Data

(63) Continuation of application No. 16/191,760, filed on Nov. 15, 2018, now Pat. No. 10,660,156.

(Continued)

(51) Int. Cl.
| | |
|---|---|
| *H04L 12/26* | (2006.01) |
| *H04W 88/10* | (2009.01) |
| *H04W 92/12* | (2009.01) |
| *H04W 88/08* | (2009.01) |
| *H04W 76/27* | (2018.01) |
| *H04W 72/04* | (2009.01) |

(Continued)

(52) U.S. Cl.
CPC .......... *H04W 88/10* (2013.01); *H04W 28/10* (2013.01); *H04W 72/042* (2013.01); *H04W 76/27* (2018.02); *H04W 88/085* (2013.01); *H04W 92/12* (2013.01); *H04L 5/00* (2013.01); *H04L 47/34* (2013.01); *H04W 4/70* (2018.02); *H04W 28/0278* (2013.01); *H04W 28/12* (2013.01); *H04W 80/02* (2013.01); *H04W 80/08* (2013.01)

(58) Field of Classification Search
CPC ... H04W 88/10; H04W 88/085; H04W 76/27; H04W 28/10; H04W 72/042; H04W 92/12
USPC .......................... 370/252, 329–330, 335–348
See application file for complete search history.

(56) References Cited

U.S. PATENT DOCUMENTS

| | | | | |
|---|---|---|---|---|
| 9,648,514 B2 * | 5/2017 | Blankenship | ...... | H04B 7/15507 |
| 10,660,156 B2 * | 5/2020 | Han | ...... | H04W 28/10 |

(Continued)

*Primary Examiner* — Thai D Hoang
(74) *Attorney, Agent, or Firm* — Kowert, Hood, Munyon, Rankin & Goetzel, P.C.

(57) ABSTRACT

An apparatus of a RAN node in which flexible feedback for user data transferred between RAN nodes is described. The DL PDCP PDUs to be delivered to a UE is transmitted over an Xn or X2 interface between RAN and NG-RAN nodes, respectively. Feedback received allows transmitting RAN node to control downlink user data flow. The feedback contains a DDDS frame that includes a highest transmitted and delivered PDCP SN indicator parameter that respectively indicates whether a highest transmitted and successfully delivered PDCP PDU is present in the DDDS message and a highest transmitted and successfully delivered PDCP SN PDU parameter that provides feedback respectively about a transmitted status of the PDU sequence and an in-sequence delivery status of the PDUs to the UE. Buffered PDUs reported by the DDDS message are removed from memory as transmitted or successfully delivered PDUs.

20 Claims, 9 Drawing Sheets

Related U.S. Application Data

(60) Provisional application No. 62/586,764, filed on Nov. 15, 2017.

(51) Int. Cl.
*H04W 28/10* (2009.01)
*H04W 28/12* (2009.01)
*H04W 80/02* (2009.01)
*H04W 80/08* (2009.01)
*H04L 12/801* (2013.01)
*H04W 4/70* (2018.01)
*H04W 28/02* (2009.01)
*H04L 5/00* (2006.01)

(56) References Cited

U.S. PATENT DOCUMENTS

2017/0288848 A1* 10/2017 Lei ............... H04L 27/2656
2018/0054753 A1* 2/2018 Fujishiro ........... H04W 28/0215
2018/0302827 A1* 10/2018 Mitsui ............. H04W 36/0061
2019/0150224 A1 5/2019 Han et al.
2019/0200273 A1* 6/2019 Pedersen ............. H04L 47/32
2019/0246310 A1* 8/2019 Han ................ H04W 28/04
2019/0364464 A1* 11/2019 Shaikh ............. H04L 12/1407

* cited by examiner

FLEXIBLE FLOW CONTROL MECHANISM FOR NG-RAN INTERFACES

PRIORITY CLAIM

This application claims the benefit of priority under 35 U.S.C. 119(e) to U.S. Provisional Patent Application Ser. No. 62/586,764, filed Nov. 15, 2017, which is incorporated herein by reference in its entirety.

TECHNICAL FIELD

Embodiments pertain to radio access networks (RANs). Some embodiments relate to cellular and wireless local area network (WLAN) networks, including Third Generation Partnership Project Long Term Evolution (3GPP LTE) networks and LTE advanced (LTE-A) networks as well as legacy networks, $4^{th}$ generation (4G) networks and $5^{th}$ generation (5G) New Radio (NR) (or next generation (NG)) networks. Some embodiments relate to flow control between NR nodeBs (gNBs).

BACKGROUND

The use of various types of systems has increased due to both an increase in the types of devices user equipment (UEs) using network resources as well as the amount of data and bandwidth being used by various applications, such as video streaming, operating on these UEs. To increase the ability of the network to contend with the explosion in network use and variation, the next generation of communication systems is being created. As per the norm, with the advent of any new technology, the introduction of a complex new communication system engenders a large number of issues to be addressed both in the system itself and in compatibility with previous systems and devices. Such issues arise, for example, from the multitude of interfaces that may be used when NG systems and devices are used in conjunction with earlier networks and devices.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

Figure 1:
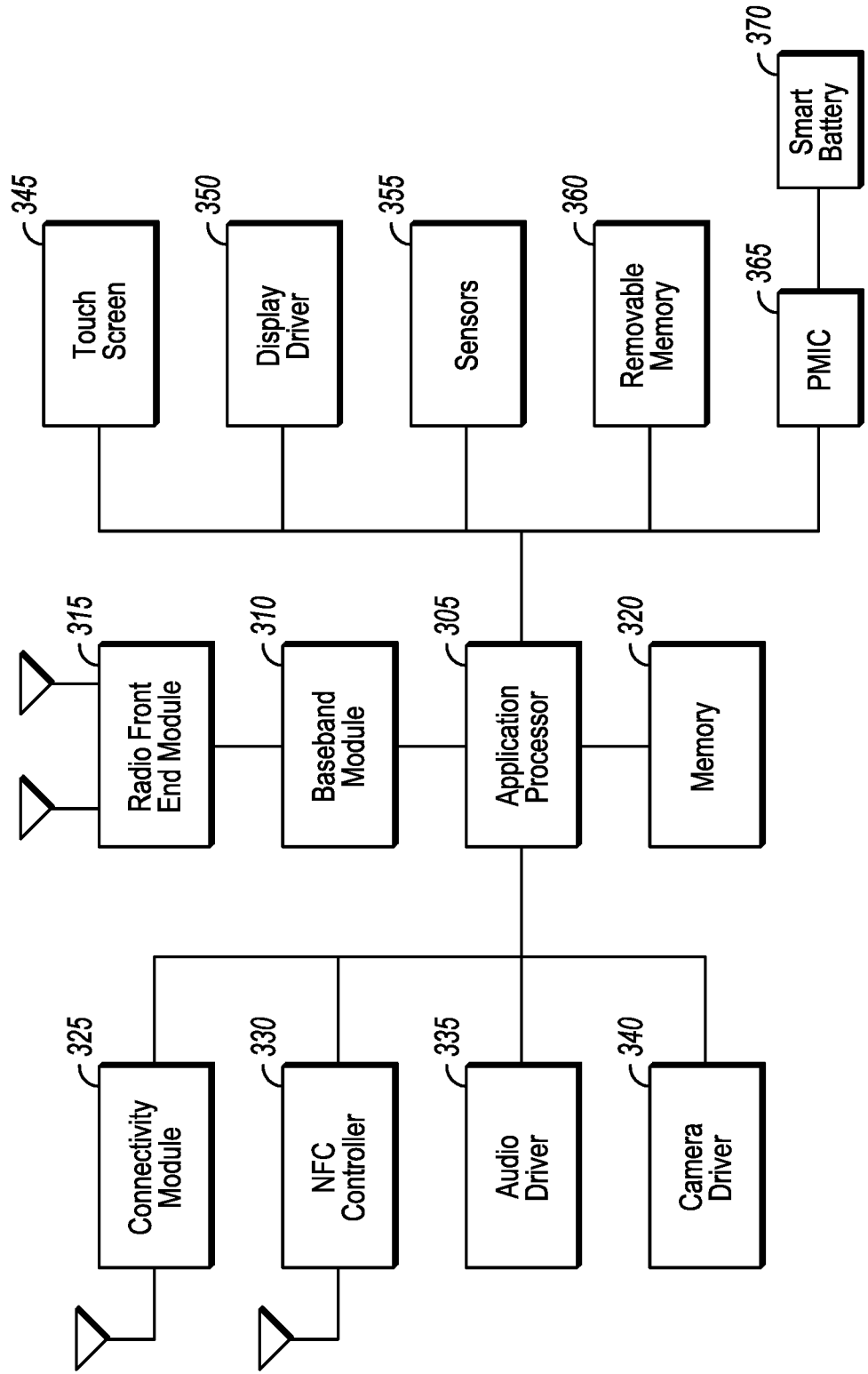
FIG. 1 illustrates a UE in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Any of the radio links described herein may operate according to any one or more of the following exemplary radio communication technologies and/or standards including, but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP NG, 3GPP LTE Extra, LTE-Advanced Pro, LTE Licensed-Assisted Access (LAA), MulteFire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, and the like), technologies operating above 300 GHz and THz bands, (3GPP/LTE based or IEEE 802.11p and other), Vehicle-to-Vehicle (V2V), Vehicle-to-X (V2X), Vehicle-to-Infrastructure (V2I), and Infrastructure-to-Vehicle (I2V) communication technologies, 3GPP cellular V2X, DSRC (Dedicated Short Range Communications) communication systems such as Intelligent-Transport-Systems and others.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" NG initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz); the 70.2 GHz-71 GHz band; any band between 65.88 GHz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) where in particular the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP by allocating the OFDM carrier data bit vectors to the corresponding symbol resources.

FIG. 1 illustrates a UE in accordance with some embodiments. The user device 100 may be a mobile device in some aspects and includes an application processor 105, baseband processor 110 (also referred to as a baseband sub-system), radio front end module (RFEM) 115, memory 120, connectivity sub-system 125, near field communication (NFC) controller 130, audio driver 135, camera driver 140, touch screen 145, display driver 150, sensors 155, removable memory 160, power management integrated circuit (PMIC) 165 and smart battery 170.

In some aspects, application processor 105 may include, for example, one or more CPU cores and one or more of cache memory, low drop-out voltage regulators (LDOs), interrupt controllers, serial interfaces such as serial peripheral interface (SPI), inter-integrated circuit (I$^2$C) or universal programmable serial interface circuit, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband processor 110 may be implemented, for example, as a solder-down substrate including one or more integrated circuits, a single packaged integrated circuit soldered to a main circuit board, and/or a multi-chip module containing two or more integrated circuits.

Figure 2:
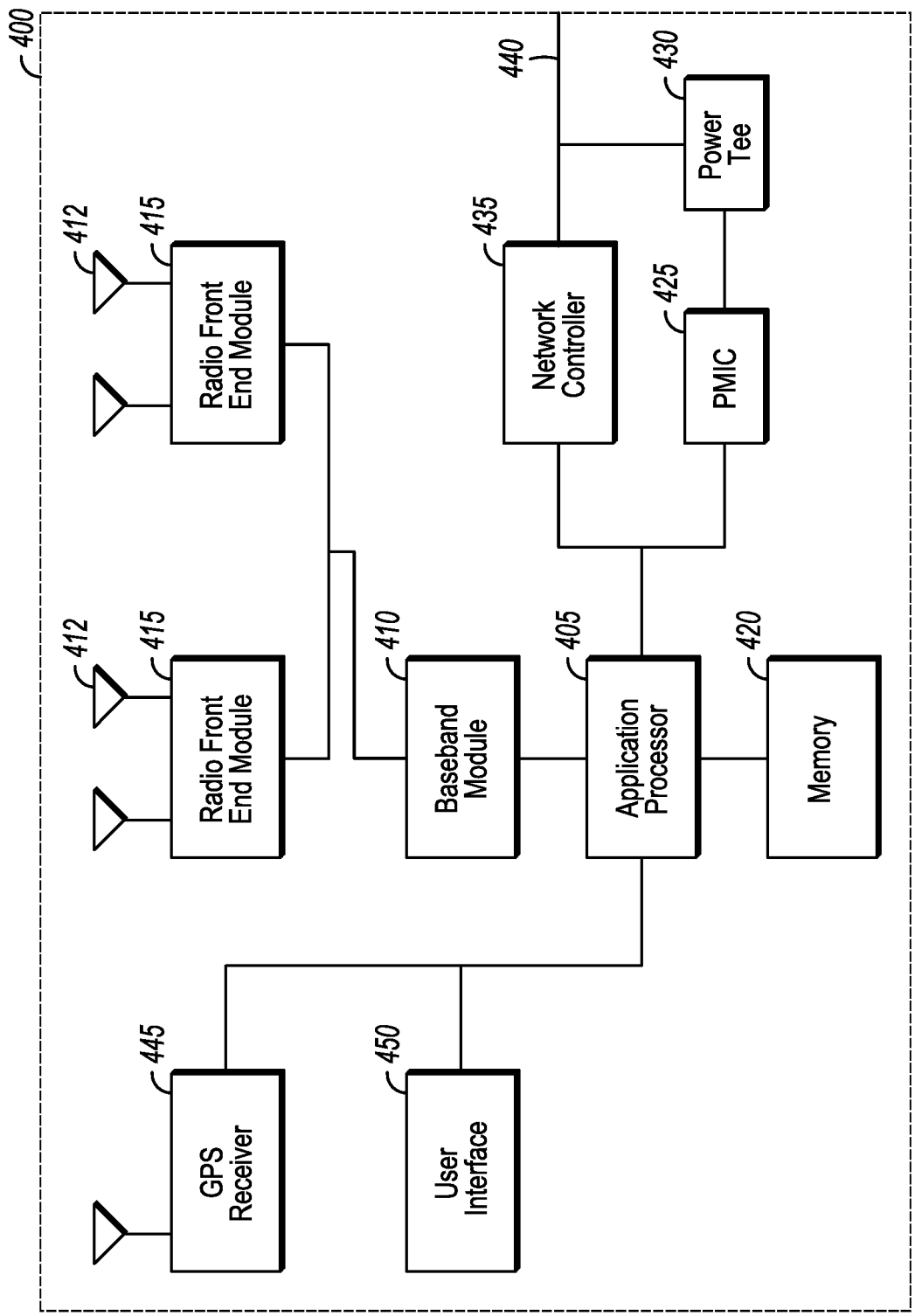
FIG. 2 illustrates a base station or infrastructure equipment radio head in accordance with some embodiments.

FIG. 2 illustrates a base station in accordance with some embodiments. The base station radio head 200 may include one or more of application processor 205, baseband processor 210, one or more radio front end modules 215, memory 220, power management circuitry 225, power tee circuitry 230, network controller 235, network interface connector 240, satellite navigation receiver 245, and user interface 250.

In some aspects, application processor 205 may include one or more CPU cores and one or more of cache memory, low drop-out voltage regulators (LDOs), interrupt controllers, serial interfaces such as SPI, I$^2$C or universal programmable serial interface, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 210 may be implemented, for example, as a solder-down substrate including one or more integrated circuits, a single packaged integrated circuit soldered to a main circuit board or a multi-chip module containing two or more integrated circuits.

In some aspects, memory 220 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM) and/or a three-dimensional crosspoint memory. Memory 220 may be implemented as one or more of solder down packaged integrated circuits, socketed memory modules and plug-in memory cards.

In some aspects, power management integrated circuitry 225 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 230 may provide for electrical power drawn from a network cable to provide both power supply and data connectivity to the base station radio head 200 using a single cable.

In some aspects, network controller 235 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver 245 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 245 may provide data to application processor 205 which may include one or more of position data or time data. Application processor 205 may use time data to synchronize operations with other radio base stations.

In some aspects, user interface 250 may include one or more of physical or virtual buttons, such as a reset button, one or more indicators such as light emitting diodes (LEDs) and a display screen.

A radio front end module may incorporate a millimeter wave radio front end module (RFEM) and one or more sub-millimeter wave radio frequency integrated circuits (RFIC). In this aspect, the one or more sub-millimeter wave RFICs may be physically separated from a millimeter wave RFEM. The RFICs may include connection to one or more antennas. The RFEM may be connected to multiple antennas. Alternatively both millimeter wave and sub-millimeter wave radio functions may be implemented in the same physical radio front end module. Thus, the RFEM may incorporate both millimeter wave antennas and sub-millimeter wave antennas.

Figure 3:
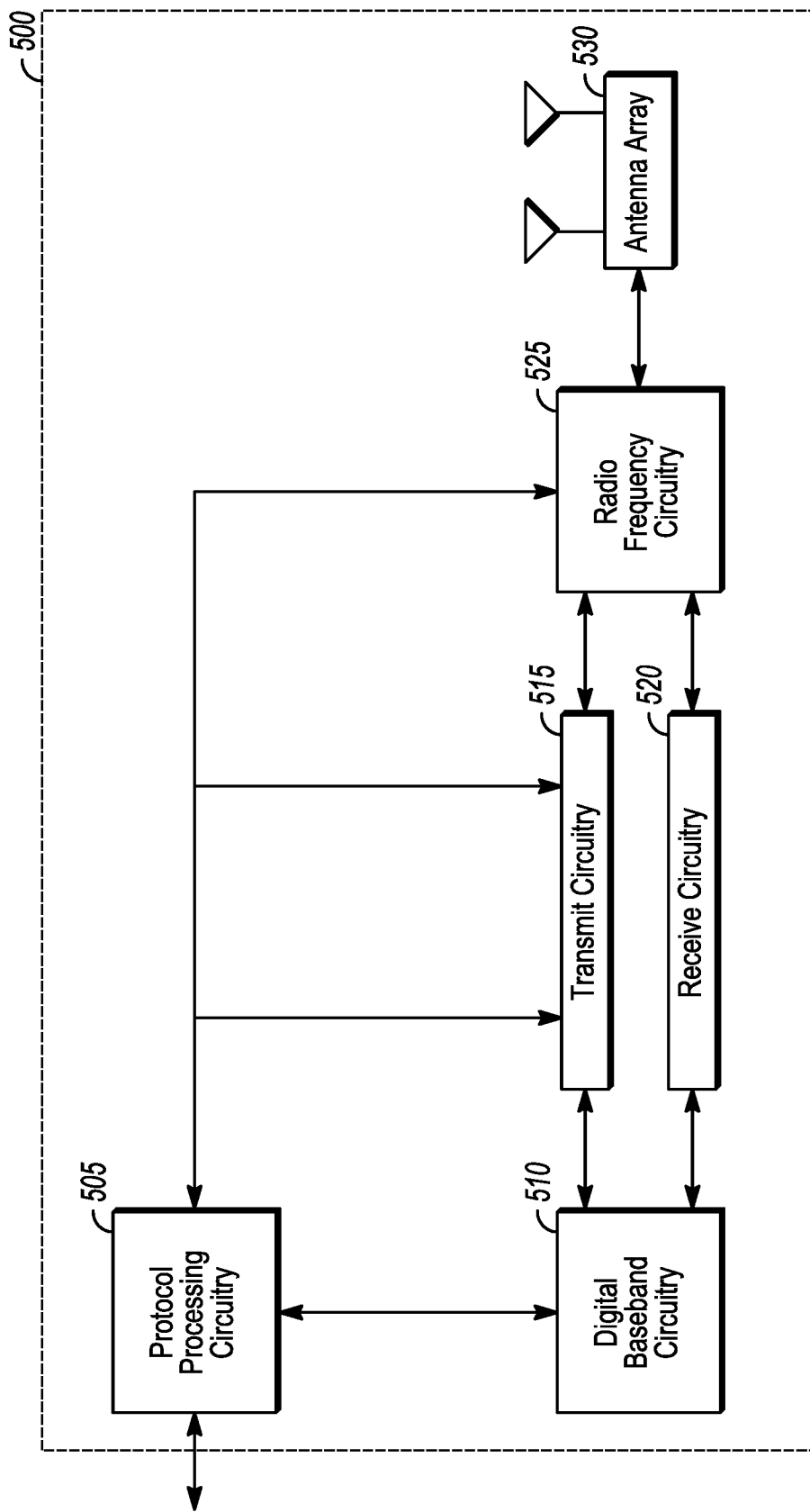
FIG. 3 illustrates millimeter wave communication circuitry in accordance with some embodiments.

FIG. 3 illustrates millimeter wave communication circuitry in accordance with some embodiments. Circuitry 300 is alternatively grouped according to functions. Components as shown in 300 are shown here for illustrative purposes and may include other components not shown here.

Millimeter wave communication circuitry 300 may include protocol processing circuitry 305, which may implement one or more of medium access control (MAC), radio link control (RLC), packet data convergence protocol (PDCP), radio resource control (RRC) and non-access stratum (NAS) functions. Protocol processing circuitry 305 may include one or more processing cores (not shown) to execute instructions and one or more memory structures (not shown) to store program and data information.

Millimeter wave communication circuitry 300 may further include digital baseband circuitry 310, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Millimeter wave communication circuitry 300 may further include transmit circuitry 315, receive circuitry 320 and/or antenna array circuitry 330.

Millimeter wave communication circuitry 300 may further include radio frequency (RF) circuitry 325. In an aspect, RF circuitry 325 may include multiple parallel RF chains for one or more of transmit or receive functions, each connected to one or more antennas of the antenna array 330.

In an aspect of the disclosure, protocol processing circuitry 305 may include one or more instances of control circuitry (not shown) to provide control functions for one or more of digital baseband circuitry 310, transmit circuitry 315, receive circuitry 320, and/or radio frequency circuitry 325.

The transmit circuitry of may include one or more of digital to analog converters (DACs), analog baseband circuitry, up-conversion circuitry and filtering and amplification circuitry, the latter of which may provide an amount of amplification that is controlled by an automatic gain control (AGC). In another aspect, the transmit circuitry may include digital transmit circuitry and output circuitry.

The radio frequency circuitry may include one or more instances of radio chain circuitry, which in some aspects may include one or more filters, power amplifiers, low noise amplifiers, programmable phase shifters and power supplies. The radio frequency circuitry may include power combining and dividing circuitry in some aspects. In some aspects, the power combining and dividing circuitry may operate bidirectionally, such that the same physical circuitry may be configured to operate as a power divider when the device is transmitting, and as a power combiner when the device is receiving. In some aspects, the power combining and dividing circuitry may one or more include wholly or partially separate circuitries to perform power dividing when the device is transmitting and power combining when the device is receiving. In some aspects, the power combining and dividing circuitry may include passive circuitry comprising one or more two-way power divider/combiners arranged in a tree. In some aspects, the power combining and dividing circuitry may include active circuitry comprising amplifier circuits.

In some aspects, the radio frequency circuitry may connect to transmit circuitry and receive circuitry via one or more radio chain interfaces or a combined radio chain interface. In some aspects, one or more radio chain interfaces may provide one or more interfaces to one or more receive or transmit signals, each associated with a single antenna structure which may comprise one or more antennas.

In some aspects, the combined radio chain interface may provide a single interface to one or more receive or transmit signals, each associated with a group of antenna structures comprising one or more antennas.

The receive circuitry may include one or more of parallel receive circuitry and/or one or more of combined receive circuitry. In some aspects, the one or more parallel receive circuitry and one or more combined receive circuitry may include one or more Intermediate Frequency (IF) downconversion circuitry, IF processing circuitry, baseband down-conversion circuitry, baseband processing circuitry and analog-to-digital converter (ADC) circuitry.

In an aspect, the RF circuitry may include one or more of each of IF interface circuitry, filtering circuitry, upconversion and downconversion circuitry, synthesizer circuitry, filtering and amplification circuitry, power combining and dividing circuitry and radio chain circuitry.

In an aspect, the baseband processor may contain one or more digital baseband systems. In an aspect, the one or more digital baseband subsystems may be coupled via an interconnect subsystem to one or more of a CPU subsystem, audio subsystem and interface subsystem. In an aspect, the one or more digital baseband subsystems may be coupled via another interconnect subsystem to one or more of each of digital baseband interface and mixed-signal baseband sub-system. In an aspect, the interconnect subsystems may each include one or more of each of buses point-to-point connections and network-on-chip (NOC) structures.

In an aspect, an audio sub-system may include one or more of digital signal processing circuitry, buffer memory, program memory, speech processing accelerator circuitry, data converter circuitry such as analog-to-digital and digital-to-analog converter circuitry, and analog circuitry including one or more of amplifiers and filters. In an aspect, a mixed signal baseband sub-system may include one or more of an IF interface, analog IF subsystem, downconverter and upconverter subsystem, analog baseband subsystem, data converter subsystem, synthesizer and control sub-system.

A baseband processing subsystem may include one or more of each of DSP sub-systems, interconnect sub-system, boot loader sub-system, shared memory sub-system, digital I/O sub-system, digital baseband interface sub-system and audio sub-system. In an example aspect, the baseband processing subsystem may include one or more of each of an accelerator subsystem, buffer memory, interconnect sub-system, audio sub-system, shared memory sub-system, digital I/O subsystem, controller sub-system and digital baseband interface sub-system.

In an aspect, the boot loader sub-system may include digital logic circuitry configured to perform configuration of the program memory and running state associated with each of the one or more DSP sub-systems. The configuration of the program memory of each of the one or more DSP sub-systems may include loading executable program code from storage external to baseband processing sub-system. The configuration of the running state associated with each of the one or more DSP sub-systems may include one or more of the steps of: setting the state of at least one DSP core which may be incorporated into each of the one or more DSP sub-systems to a state in which it is not running, and setting the state of at least one DSP core which may be incorporated into each of the one or more DSP sub-systems into a state in which it begins executing program code starting from a predefined memory location.

In an aspect, the shared memory sub-system may include one or more of a read-only memory (ROM), static random access memory (SRAM), embedded dynamic random access memory (eDRAM) and non-volatile random access memory (NVRAM). In an aspect, the digital I/O subsystem may include one or more of serial interfaces such as I²C, SPI or other 1, 2 or 3-wire serial interfaces, parallel interfaces such as general-purpose input-output (GPIO), register access interfaces and direct memory access (DMA). In an aspect, a register access interface implemented in digital I/O subsystem may permit a microprocessor core external to baseband processing subsystem (1000 cross reference) to read and/or write one or more of control and data registers and memory. In an aspect, DMA logic circuitry implemented in digital I/O subsystem may permit transfer of contiguous blocks of data between memory locations including memory locations internal and external to baseband processing subsystem. In an aspect, the digital baseband interface sub-system may provide for the transfer of digital baseband samples between the baseband processing subsystem and mixed signal baseband or radio-frequency circuitry external to the baseband processing subsystem. In an aspect, the digital baseband samples transferred by the digital baseband interface sub-system may include in-phase and quadrature (I/Q) samples.

In an aspect, the controller sub-system may include one or more of each of control and status registers and control state machines. In an aspect, the control and status registers may be accessed via a register interface and may provide for one or more of: starting and stopping operation of control state machines, resetting control state machines to a default state, configuring optional processing features, configuring the generation of interrupts and reporting the status of operations. In an aspect, each of the one or more control state machines may control the sequence of operation of each of the one or more accelerator sub-systems.

In an aspect, the DSP sub-system may include one or more of each of a DSP core sub-system, local memory, direct memory access sub-system, accelerator sub-system, external interface sub-system, power management unit and interconnect sub-system. In an aspect, the local memory may include one or more of each of read-only memory, static random access memory or embedded dynamic random access memory. In an aspect, the direct memory access sub-system may provide registers and control state machine circuitry adapted to transfer blocks of data between memory locations including memory locations internal and external to the digital signal processor sub-system. In an aspect, the external interface sub-system may provide for access by a microprocessor system external to DSP sub-system to one or more of memory, control registers and status registers which may be implemented in the DSP sub-system. In an aspect, the external interface sub-system may provide for transfer of data between local memory and storage external to the DSP sub-system under the control of one or more of the DMA sub-system and DSP core sub-system.

Figure 4:
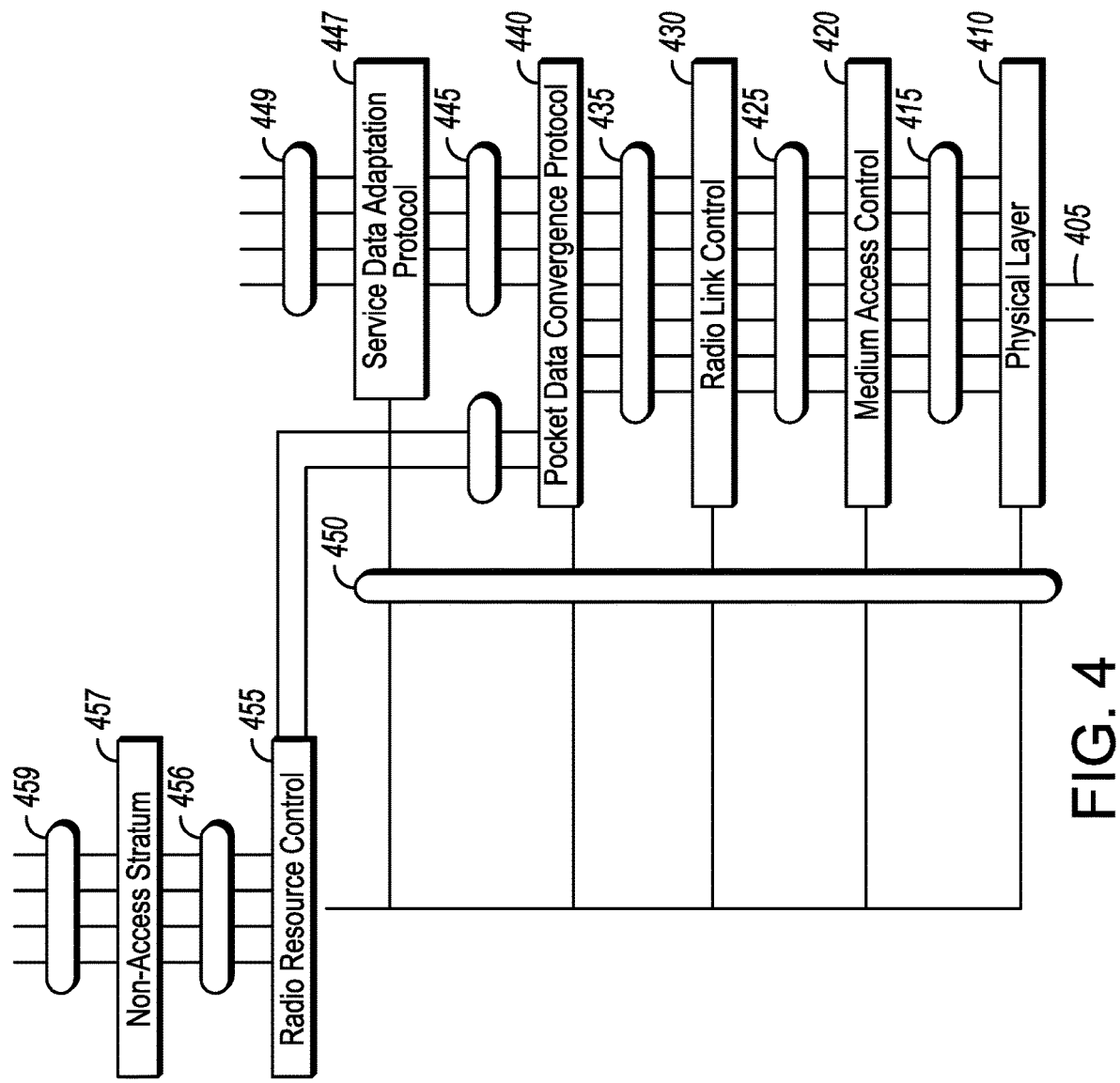
FIG. 4 is an illustration of protocol functions in accordance with some embodiments.

FIG. 4 is an illustration of protocol functions in accordance with some embodiments. The protocol functions may be implemented in a wireless communication device according to some aspects. In some aspects, the protocol layers may include one or more of physical layer (PHY) 410, medium access control layer (MAC) 420, radio link control layer (RLC) 430, packet data convergence protocol layer (PDCP) 440, service data adaptation protocol (SDAP) layer 447, radio resource control layer (RRC) 455, and non-access stratum (NAS) layer 457, in addition to other higher layer functions not illustrated.

According to some aspects, the protocol layers may include one or more service access points that may provide communication between two or more protocol layers. According to some aspects, the PHY 410 may transmit and receive physical layer signals 405 that may be received or transmitted respectively by one or more other communication devices. According to some aspects, physical layer signals 405 may comprise one or more physical channels.

According to some aspects, an instance of PHY 410 may process requests from and provide indications to an instance of MAC 420 via one or more physical layer service access points (PHY-SAP) 415. According to some aspects, requests and indications communicated via PHY-SAP 415 may comprise one or more transport channels.

According to some aspects, an instance of MAC 410 may process requests from and provide indications to an instance of RLC 430 via one or more medium access control service access points (MAC-SAP) 425. According to some aspects, requests and indications communicated via MAC-SAP 425 may comprise one or more logical channels.

According to some aspects, an instance of RLC 430 may process requests from and provide indications to an instance of PDCP 440 via one or more radio link control service access points (RLC-SAP) 435. According to some aspects, requests and indications communicated via RLC-SAP 435 may comprise one or more RLC channels.

According to some aspects, an instance of PDCP 440 may process requests from and provide indications to one or more of an instance of RRC 455 and one or more instances of SDAP 447 via one or more packet data convergence protocol service access points (PDCP-SAP) 445. According to some aspects, requests and indications communicated via PDCP-SAP 445 may comprise one or more radio bearers.

According to some aspects, an instance of SDAP 447 may process requests from and provide indications to one or more higher layer protocol entities via one or more service data adaptation protocol service access points (SDAP-SAP) 449. According to some aspects, requests and indications communicated via SDAP-SAP 449 may comprise one or more quality of service (QoS) flows.

According to some aspects, RRC entity 455 may configure, via one or more management service access points (M-SAP), aspects of one or more protocol layers, which may include one or more instances of PHY 410, MAC 420, RLC 430, PDCP 440 and SDAP 447. According to some aspects, an instance of RRC 455 may process requests from and provide indications to one or more NAS entities via one or more RRC service access points (RRC-SAP) 456.

Figure 5:
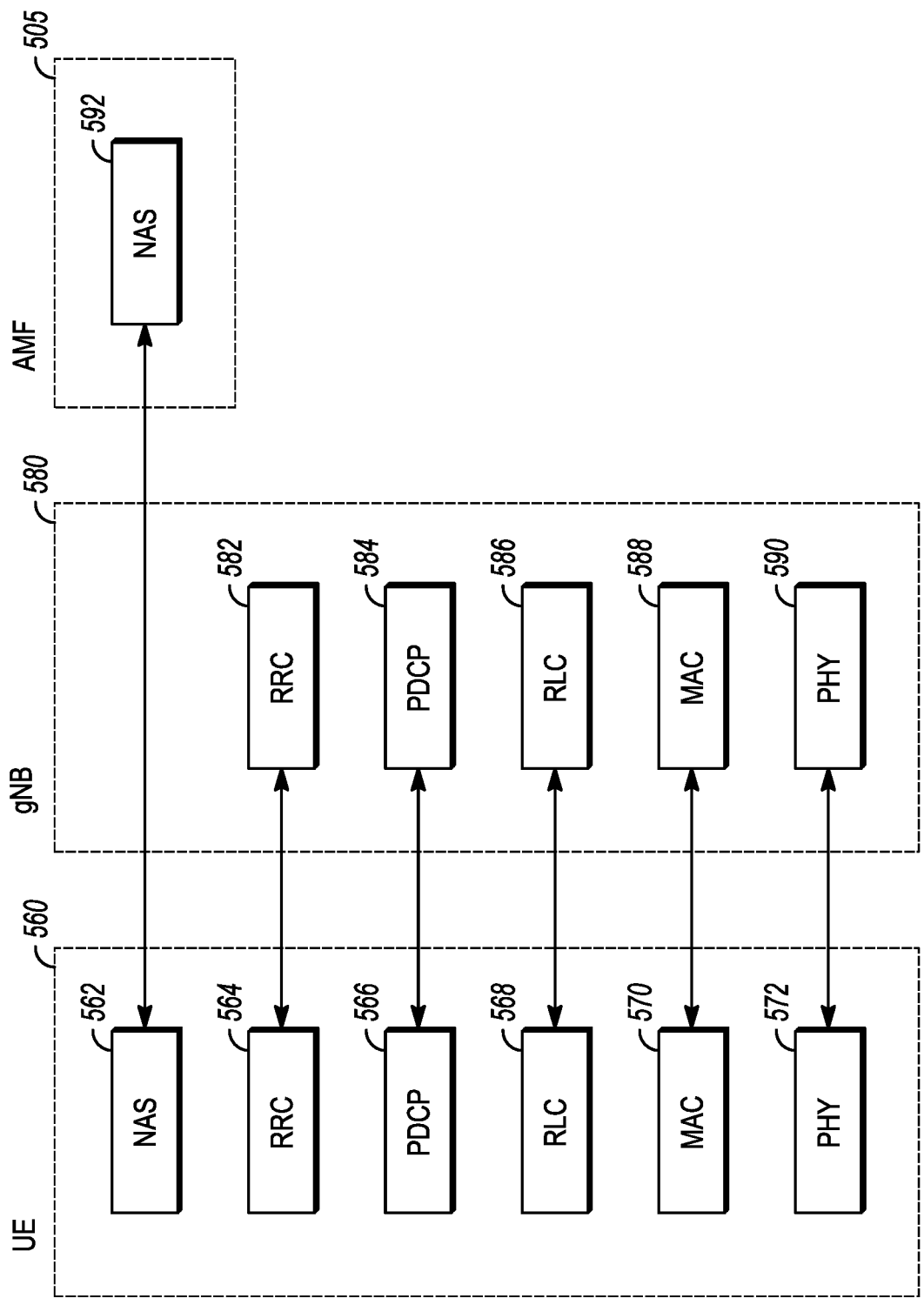
FIG. 5 is an illustration of protocol entities in accordance with some embodiments.

FIG. 5 is an illustration of protocol entities in accordance with some embodiments. The protocol entities may be implemented in wireless communication devices, including one or more of a user equipment (UE) 560, a base station, which may be termed an evolved node B (eNB), or new radio node B (gNB) 580, and a network function, which may be termed a mobility management entity (MME), or an access and mobility management function (AMF) 594, according to some aspects.

According to some aspects, gNB 580 may be implemented as one or more of a dedicated physical device such as a macro-cell, a femto-cell or other suitable device, or in an alternative aspect, may be implemented as one or more software entities running on server computers as part of a virtual network termed a cloud radio access network (CRAN).

According to some aspects, one or more protocol entities that may be implemented in one or more of UE 560, gNB 580 and AMF 594, may be described as implementing all or part of a protocol stack in which the layers are considered to be ordered from lowest to highest in the order PHY, MAC, RLC, PDCP, RRC and NAS. According to some aspects, one or more protocol entities that may be implemented in one or more of UE 560, gNB 580 and AMF 594, may communicate with a respective peer protocol entity that may be implemented on another device, using the services of respective lower layer protocol entities to perform such communication.

According to some aspects, UE PHY 572 and peer entity gNB PHY 590 may communicate using signals transmitted and received via a wireless medium. According to some aspects, UE MAC 570 and peer entity gNB MAC 588 may communicate using the services provided respectively by UE PHY 572 and gNB PHY 590. According to some aspects, UE RLC 568 and peer entity gNB RLC 586 may communicate using the services provided respectively by UE MAC 570 and gNB MAC 588. According to some aspects, UE PDCP 566 and peer entity gNB PDCP 584 may communicate using the services provided respectively by UE RLC 568 and NGNB RLC 586. According to some aspects, UE RRC 564 and gNB RRC 582 may communicate using the services provided respectively by UE PDCP 566 and gNB PDCP 584. According to some aspects, UE NAS 562 and AMF NAS 592 may communicate using the services provided respectively by UE RRC 564 and gNB RRC 582.

The UE and gNB may communicate using a radio frame structure that has a predetermined duration and repeats in a periodic manner with a repetition interval equal to the predetermined duration. The radio frame may be divided into two or more subframes. In an aspect, subframes may be of predetermined duration which may be unequal. In an alternative aspect, subframes may be of a duration which is determined dynamically and varies between subsequent repetitions of the radio frame. In an aspect of frequency division duplexing (FDD), the downlink radio frame structure is transmitted by a base station to one or devices, and uplink radio frame structure transmitted by a combination of one or more devices to a base station. The radio frame may have a duration of 10 ms. The radio frame may be divided into slots each of duration 0.5 ms, and numbered from 0 to 19. Additionally, each pair of adjacent slots numbered 2i and 2i+1, where i is an integer, may be referred to as a subframe. Each subframe may include a combination of one or more of downlink control information, downlink data information, uplink control information and uplink data information. The combination of information types and direction may be selected independently for each subframe.

According to some aspects, the downlink frame and uplink frame may have a duration of 10 ms, and uplink frame may be transmitted with a timing advance with respect to downlink frame. According to some aspects, the downlink frame and uplink frame may each be divided into two or more subframes, which may be 1 ms in duration. According to some aspects, each subframe may consist of one or more slots. In some aspects, the time intervals may be represented in units of $T_s$. According to some aspects, $T_s$ may be defined as $1/(30{,}720\times1000)$ seconds. According to some aspects, a radio frame may be defined as having duration $30{,}720 \cdot T_s$, and a slot may be defined as having duration $15{,}360 \cdot T_s$. According to some aspects, $T_s$ may be defined as $$T_s=1/(\Delta f_{max}\cdot N_f),$$

where $\Delta f_{max}=480\times10^3$ and $Nf=4{,}096$. According to some aspects E, the number of slots may be determined based on a numerology parameter, which may be related to a frequency spacing between subcarriers of a multicarrier signal used for transmission.

Constellation designs of a single carrier modulation scheme that may be transmitted or received may contain 2 points, known as binary phase shift keying (BPSK), 4 points, known as quadrature phase shift keying (QPSK), 16 points, known as quadrature amplitude modulation (QAM) with 16 points (16QAM or QAM16) or higher order modulation constellations, containing for example 64, 256 or 1024 points. In the constellations, the binary codes are assigned to the points of the constellation using a scheme such that nearest-neighbor points, that is, pairs of points separated from each other by the minimum Euclidian distance, have an assigned binary code differing by only one binary digit. For example, the point assigned code 1000 has nearest neighbor points assigned codes 1001, 0000, 1100 and 1010, each of which differs from 1000 by only one bit.

Alternatively, the constellation points may be arranged in a square grid, and may be arranged such that there is an equal distance on the in-phase and quadrature plane between each pair of nearest-neighbor constellation points. In an aspect, the constellation points may be chosen such that there is a pre-determined maximum distance from the origin of the in-phase and quadrature plane of any of the allowed constellation points, the maximum distance represented by a circle. In an aspect, the set of allowed constellation points may exclude those that would fall within square regions at the corners of a square grid. The constellation points are shown on orthogonal in-phase and quadrature axes, representing, respectively, amplitudes of sinusoids at the carrier frequency and separated in phase from one another by 90 degrees. In an aspect, the constellation points are grouped into two or more sets of constellation points, the points of each set being arranged to have an equal distance to the origin of the in-phase and quadrature plane, and lying on one of a set of circles centered on the origin.

To generate multicarrier baseband signals for transmission, data may be input to an encoder to generate encoded data. The encoder may include a combination of one or more of error detecting, error correcting, rate matching, and interleaving. The encoder may further include a step of scrambling. In an aspect, encoded data may be input to a modulation mapper to generate complex valued modulation symbols. The modulation mapper may map groups containing one or more binary digits, selected from the encoded data, to complex valued modulation symbols according to one or more mapping tables. In an aspect, complex-valued modulation symbols may be input to the layer mapper to be mapped to one or more layer mapped modulation symbol streams. Representing a stream of modulation symbols 440 as d(i) where i represents a sequence number index, and the one or more streams of layer mapped symbols as $x^{(k)}(i)$ where k represents a stream number index and i represents a sequence number index, the layer mapping function for a single layer may be expressed as:

$$x^{(0)}(i)=d(i)$$

and the layer mapping for two layers may be expressed as:

$$x^{(0)}(i)=d(2i)$$

$$x^{(1)}(i)=d(2i+1)$$

Layer mapping may be similarly represented for more than two layers.

In an aspect, one or more streams of layer mapped symbols may be input to the precoder which generates one or more streams of precoded symbols. Representing the one or more streams of layer mapped symbols as a block of vectors:

$$[x^{(0)}(i) \ldots x^{(v-1)}(i)]^T$$

where i represents a sequence number index in the range 0 to $M_{symb}^{layer}-1$ the output is represented as a block of vectors:

$$[z^{(0)}(i) \ldots z^{(P-1)}(i)]^T$$

where i represents a sequence number index in the range 0 to $M_{symb}^{ap}-1$. The precoding operation may be configured to include one of direct mapping using a single antenna port, transmit diversity using space-time block coding, or spatial multiplexing.

In an aspect, each stream of precoded symbols may be input to a resource mapper which generates a stream of resource mapped symbols. The resource mapper may map precoded symbols to frequency domain subcarriers and time domain symbols according to a mapping which may include contiguous block mapping, randomized mapping or sparse mapping according to a mapping code.

In an aspect, the resource mapped symbols may be input to multicarrier generator which generates a time domain baseband symbol. Multicarrier generator may generate time domain symbols using, for example, an inverse discrete Fourier transform (DFT), commonly implemented as an inverse fast Fourier transform (FFT) or a filter bank comprising one or more filters. In an aspect, where resource mapped symbols 455 are represented as $s_k(i)$, where k is a subcarrier index and i is a symbol number index, a time domain complex baseband symbol x(t) may be represented as:

$$x(t) = \sum_k s_k(i) p_T(t - T_{sym}) \exp[j2\pi f_k(t - T_{sym} - \tau_k)]$$

Where $p_T(t)$ is a prototype filter function, $T_{sym}$ is the start time of the symbol period, $\tau_k$ is a subcarrier dependent time offset, and $f_k$ is the frequency of subcarrier k. Prototype functions $p_T(t)$ may be, for example, rectangular time domain pulses, Gaussian time domain pulses or any other suitable function.

In some aspects, a sub-component of a transmitted signal consisting of one subcarrier in the frequency domain and one symbol interval in the time domain may be termed a resource element. Resource elements may be depicted in a grid form. In some aspects, resource elements may be grouped into rectangular resource blocks consisting of 12 subcarriers in the frequency domain and the P symbols in the time domain, where P may correspond to the number of symbols contained in one slot, and may be 6, 7, or any other suitable number of symbols. In some alternative aspects, resource elements may be grouped into resource blocks consisting of 12 subcarriers in the frequency domain and one symbol in the time domain. Each resource element 05 may be indexed as (k, 1) where k is the index number of subcarrier, in the range 0 to N·M−1, where N is the number of subcarriers in a resource block, and M is the number of resource blocks spanning a component carrier in the frequency domain.

In some aspects, coding of the signal to be transmitted may include one or more physical coding processes that may be used to provide coding for a physical channel that may encode data or control information. Coding may also include multiplexing and interleaving that generates combined coded information by combining information from one or more sources, which may include one of more of data information and control information, and which may have been encoded by one or more physical coding processes. The combined coded information may be input to a scrambler which may generate scrambled coded information. Physical coding process may include one or more of CRC attachment, code block segmentation, channel coding, rate matching and code block concatenation. An encoder that may be used to encode data according to one of a convolutional code and a tail-biting convolutional code.

A MAC entity that may be used to implement medium access control layer functions may include one or more of a controller, a logical channel prioritizing unit, a channel multiplexer & de-multiplexer, a PDU filter unit, random access protocol entity, data hybrid automatic repeat request protocol (HARQ) entity and broadcast HARQ entity. According to some aspects, a higher layer may exchange control and status messages with controller via management service access point. According to some aspects, MAC service data units (SDU) corresponding to one or more logical channels may be exchanged with the MAC entity via one or more service access points (SAP). According to some aspects, a PHY SDU corresponding to one or more transport channels may be exchanged with a physical layer entity via one or more SAPs. According to some aspects, the logical channel prioritization unit may perform prioritization amongst one or more logical channels, which may include storing parameters and state information corresponding to each of the one or more logical channels, that may be initialized when a logical channel is established. According to some aspects, the logical channel prioritization unit may be configured with a set of parameters for each of one or more logical channels, each set including parameters which may include one or more of a prioritized bit rate (PBR) and a bucket size duration (BSD).

According to some aspects, the multiplexer & de-multiplexer may generate MAC PDUs, which may include one or more of MAC-SDUs or partial MAC-SDUs corresponding to one or more logical channels, a MAC header which may include one or more MAC sub-headers, one or more MAC control elements, and padding data. According to some aspects, the multiplexer & de-multiplexer may separate one or more MAC-SDUs or partial MAC-SDUs contained in a received MAC PDU, corresponding to one or more logical channels, and may indicate the one or more MAC-SDUs or partial MAC-SDUs to a higher layer via one or more service access points. According to some aspects, the HARQ entity and broadcast HARQ entity may include one or more parallel HARQ processes, each of which may be associated with a HARQ identifier, and which may be one of a receive or transmit HARQ process.

According to some aspects, a transmit HARQ process may generate a transport block (TB) to be encoded by the PHY according to a specified redundancy version (RV), by selecting a MAC-PDU for transmission. According to some aspects, a transmit HARQ process that is included in a broadcast HARQ entity may retransmit a same TB in successive transmit intervals a predetermined number of times. According to some aspects, a transmit HARQ process included in a HARQ entity may determine whether to retransmit a previously transmitted TB or to transmit a new TB at a transmit time based on whether a positive acknowledgement or a negative acknowledgement was received for a previous transmission.

According to some aspects, a receive HARQ process may be provided with encoded data corresponding to one or more received TBs and which may be associated with one or more of a new data indication (NDI) and a redundancy version (RV), and the receive HARQ process may determine whether each such received encoded data block corresponds to a retransmission of a previously received TB or a not previously received TB. According to some aspects, a receive HARQ process may include a buffer, which may be implemented as a memory or other suitable storage device, and may be used to store data based on previously received data for a TB. According to some aspects, a receive HARQ process may attempt to decode a TB, the decoding based on received data for the TB, and which may be additionally be based on the stored data based on previously received data for the TB.

Figure 6:
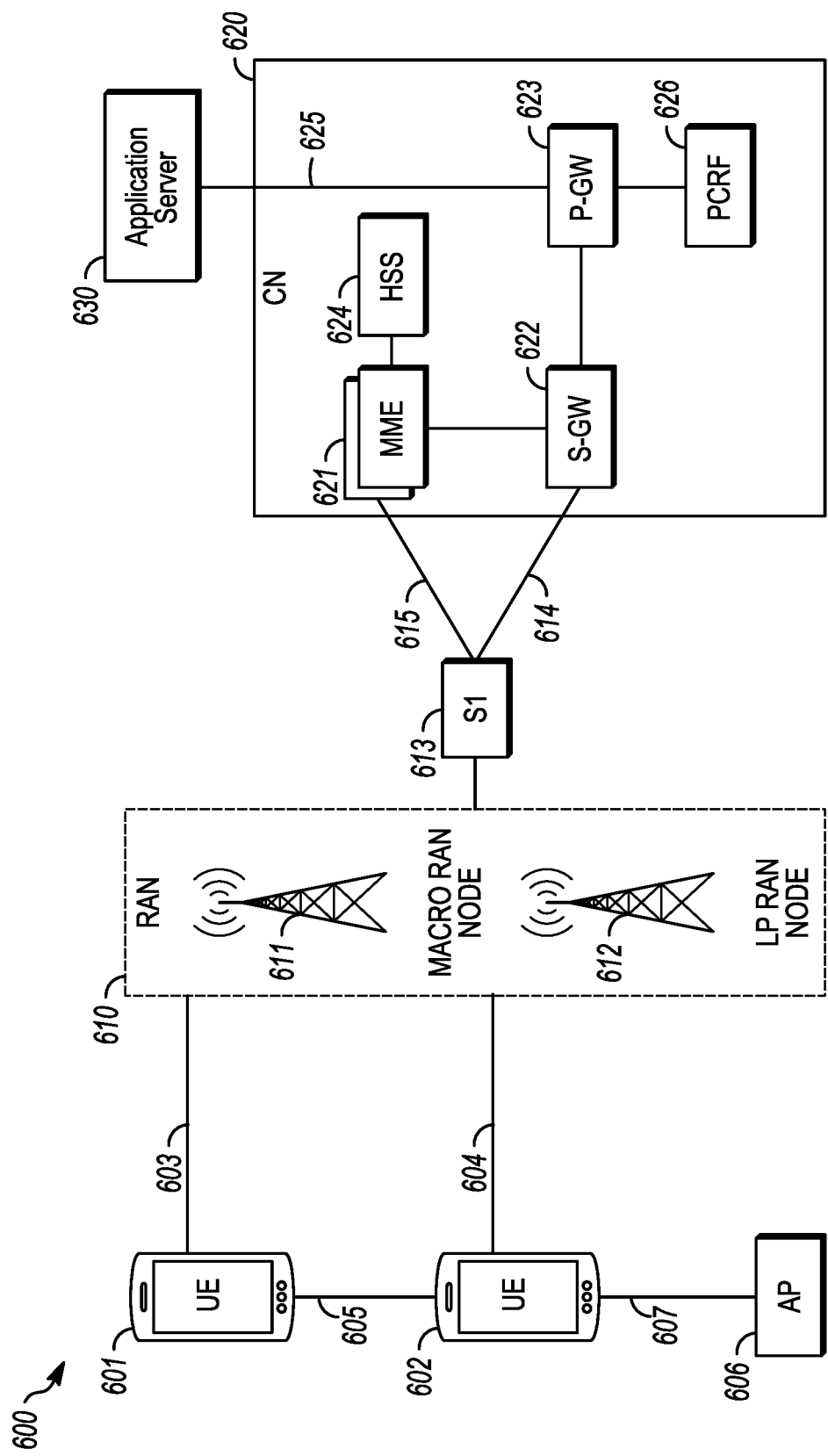
FIG. 6 illustrates an architecture of a system of a network in accordance with some embodiments.

FIG. 6 illustrates an architecture of a system of a network in accordance with some embodiments. The system 600 is shown to include a user equipment (UE) 601 and a UE 602. The UEs 601 and 602 are illustrated as smartphones (e.g., handheld touchscreen mobile computing devices connectable to one or more cellular networks), but may also comprise any mobile or non-non-mobile computing device, such as Personal Data Assistants (PDAs), pagers, laptop computers, desktop computers, wireless handsets, or any computing device including a wireless communications interface.

In some embodiments, any of the UEs 601 and 602 can comprise an Internet of Things (IoT) UE, which can comprise a network access layer designed for low-power IoT applications utilizing short-lived UE connections. An IoT UE can utilize technologies such as machine-to-machine (M2M) or MTC for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 and 602 may be configured to connect, e.g., communicatively couple, with a radio access network (RAN) 610—the RAN 610 may be, for example, an Evolved Universal Mobile Telecommunications System (UMTS) Terrestrial Radio Access Network (E-UTRAN), a NextGen RAN (NG RAN), or some other type of RAN. The UEs 601 and 602 utilize connections 603 and 604, respectively, each of which comprises a physical communications interface or layer (discussed in further detail below); in this example, the connections 603 and 604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a NG protocol, and the like.

In this embodiment, the UEs 601 and 602 may further directly exchange communication data via a ProSe interface 605. The ProSe interface 605 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 602 is shown to be configured to access an access point (AP) 606 via connection 607. The connection 607 can comprise a local wireless connection, such as a connection consistent with any IEEE 802.11 protocol, wherein the AP 606 would comprise a wireless fidelity (WiFi) router. In this example, the AP 606 is shown to be connected to the Internet without connecting to the core network of the wireless system (described in further detail below).

The RAN 610 can include one or more access nodes that enable the connections 603 and 604. These access nodes (ANs) can be referred to as base stations (BSs), NodeBs, evolved NodeBs (eNBs), next Generation NodeBs (gNBs), RAN nodes, and so forth, and can comprise ground stations (e.g., terrestrial access points) or satellite stations providing coverage within a geographic area (e.g., a cell). The RAN 610 may include one or more RAN nodes for providing macrocells, e.g., macro RAN node 611, and one or more RAN nodes for providing femtocells or picocells (e.g., cells having smaller coverage areas, smaller user capacity, or higher bandwidth compared to macrocells), e.g., low power (LP) RAN node 612.

Any of the RAN nodes 611 and 612 can terminate the air interface protocol and can be the first point of contact for the UEs 601 and 602. In some embodiments, any of the RAN nodes 611 and 612 can fulfill various logical functions for the RAN 610 including, but not limited to, radio network controller (RNC) functions such as radio bearer management, uplink and downlink dynamic radio resource management and data packet scheduling, and mobility management.

In accordance with some embodiments, the UEs 601 and 602 can be configured to communicate using Orthogonal Frequency-Division Multiplexing (OFDM) communication signals with each other or with any of the RAN nodes 611 and 612 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

The physical downlink shared channel (PDSCH) may carry user data and higher-layer signaling to the UEs 601 and 602. The physical downlink control channel (PDCCH) may carry information about the transport format and resource allocations related to the PDSCH channel, among other things. It may also inform the UEs 601 and 602 about the transport format, resource allocation, and H-ARQ (Hybrid Automatic Repeat Request) information related to the uplink shared channel. Typically, downlink scheduling (assigning control and shared channel resource blocks to the UE 602 within a cell) may be performed at any of the RAN nodes 611 and 612 based on channel quality information fed back from any of the UEs 601 and 602. The downlink resource assignment information may be sent on the PDCCH used for (e.g., assigned to) each of the UEs 601 and 602.

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 610 is shown to be communicatively coupled to a core network (CN) 620—via an S1 or NG interface 613. In embodiments, the CN 620 may be an evolved packet core (EPC) network, a NGC network, or some other type of CN. In this embodiment, the S1 interface 613 is split into two parts: the S1-U interface 614, which carries traffic data between the RAN nodes 611 and 612 and the serving gateway (S-GW) 622, and the S1-mobility management entity (MME) interface 615, which is a signaling interface between the RAN nodes 611 and 612 and MMEs 621.

In this embodiment, the CN 620 comprises the MMEs 621, the S-GW 622, the Packet Data Network (PDN) Gateway (P-GW) 623, and a home subscriber server (HSS) 624. The MMEs 621 may be similar in function to the control plane of legacy Serving General Packet Radio Service (GPRS) Support Nodes (SGSN). The MMEs 621 may manage mobility aspects in access such as gateway selection and tracking area list management. The HSS 624 may comprise a database for network users, including subscription-related information to support the network entities' handling of communication sessions. The CN 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc.

The S-GW 622 may terminate the S1 interface 613 towards the RAN 610, and routes data packets between the RAN 610 and the CN 620. In addition, the S-GW 622 may be a local mobility anchor point for inter-RAN node handovers and also may provide an anchor for inter-3GPP mobility. Other responsibilities may include lawful intercept, charging, and some policy enforcement.

The P-GW 623 may terminate an SGi interface toward a PDN. The P-GW 623 may route data packets between the EPC network 623 and external networks such as a network including the application server 630 (alternatively referred to as application function (AF)) via an Internet Protocol (IP) interface 625. Generally, the application server 630 may be an element offering applications that use IP bearer resources with the core network (e.g., UMTS Packet Services (PS) domain, LTE PS data services, etc.). In this embodiment, the P-GW 623 is shown to be communicatively coupled to an application server 630 via an IP communications interface 625. The application server 630 can also be configured to support one or more communication services (e.g., Voice-over-Internet Protocol (VoIP) sessions, PTT sessions, group communication sessions, social networking services, etc.) for the UEs 601 and 602 via the CN 620.

The P-GW 623 may further be a node for policy enforcement and charging data collection. Policy and Charging Rules Function (PCRF) 626 is the policy and charging control element of the CN 620. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630.

The components of FIG. 6 are able to read instructions from a machine-readable or computer-readable medium (e.g., a non-transitory machine-readable storage medium) and perform any one or more of the methodologies discussed herein. In particular, the processors (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may read and follow the instructions on a non-transitory medium.

Instructions may comprise software, a program, an application, an applet, an app, or other executable code for causing at least any of the processors to perform any one or more of the methodologies discussed herein. The instructions may reside, completely or partially, within at least one of the processors (e.g., within the processor's cache memory), the memory/storage devices, or any suitable combination thereof. In some embodiments, the instructions may reside on a tangible, non-volatile communication device readable medium, which may include a single medium or multiple media. Furthermore, any portion of the instructions may be transferred to the hardware resources from any combination of the peripheral devices or the databases 606. Accordingly, the memory of processors, the memory/storage devices, the peripheral devices, and the databases are examples of computer-readable and machine-readable media.

Figure 7:
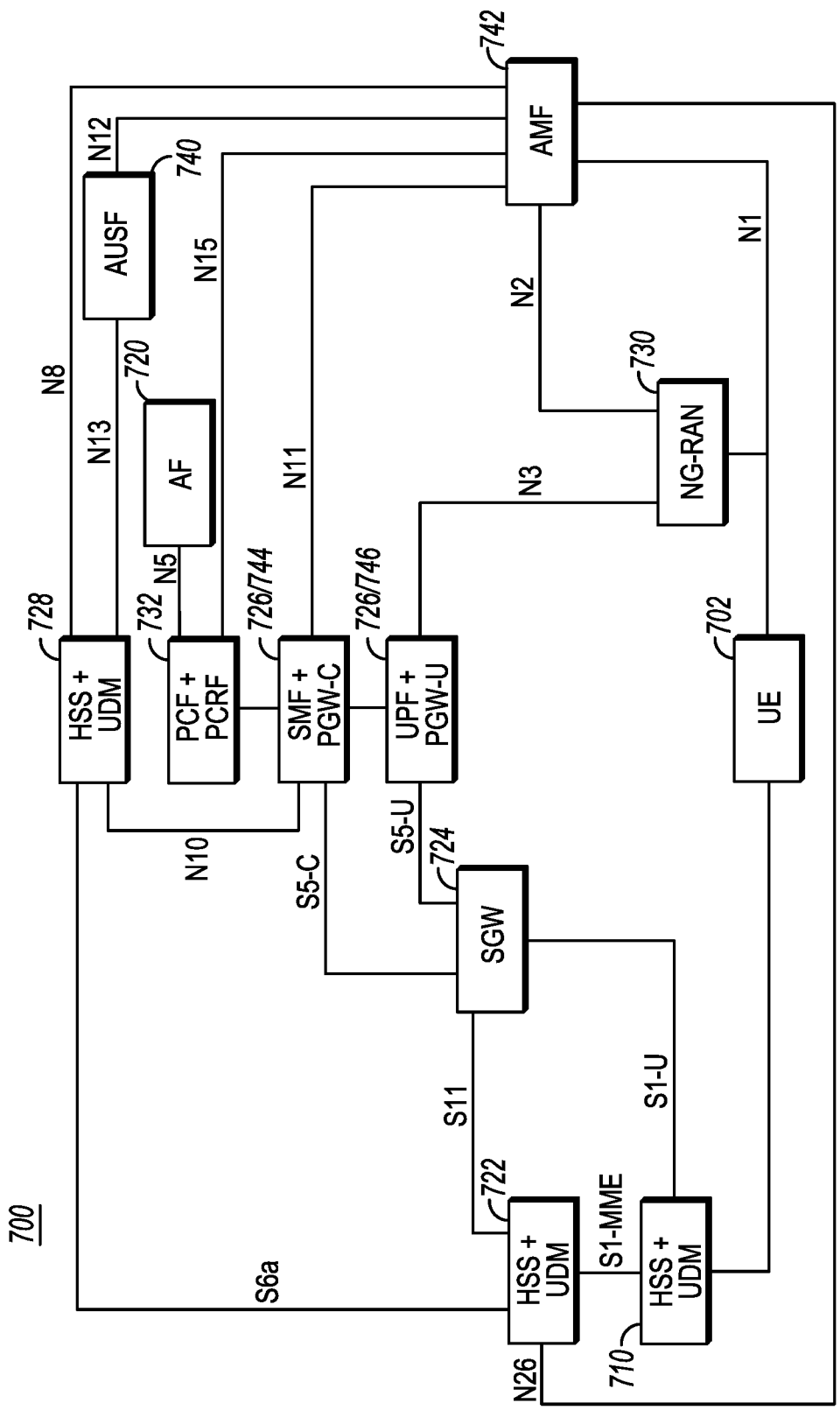
FIG. 7 illustrates a combined 4G and NG communication system in accordance with some embodiments.

The above discussion concentrates primarily on LTE networks, however, NG networks will soon start to be deployed, leading to various challenges. FIG. 7 illustrates a combined 4G and NG communication system in accordance with some embodiments. Some elements may not be shown for convenience. The 4G core network (EPC) contains, as above, protocol and reference points are defined for each entity such as the MME, SGW, and PGW. The NG (next generation) architecture as includes multiple network functions (NFs) and reference points connecting the network functions. A network function can be implemented as a discrete network element on a dedicated hardware, as a software instance running on dedicated hardware, or as a virtualized function instantiated on an appropriate platform, e.g., dedicated hardware or a cloud infrastructure.

In FIG. 7, the UE 702 may be connected to a RAN 710 of an Evolved Packet Core (EPC) and/or a NG-RAN (gNB) 730 of a NG-CN. Note that the RAN and NG-RAN are identified differently in FIG. 7, in other circumstances either may be referred to herein simply as a RAN. The RAN 710 may include one or more eNBs or general non-3GPP access points, such as that for Wi-Fi. Each of the one or more gNBs 730 may be a standalone gNB or a non-standalone gNB, e.g., operating in Dual Connectivity (DC) mode as a booster controlled by the eNB 710 through an X2 interface. The gNB 730 may, for example, provide additional capacity within a predetermined area inside the area of the eNB 710. The eNB 710 may be connected with an MME 722 of the EPC through an S1-MME interface and with a SGW 724 of the EPC through an S1-U interface. The MME 722 may be connected with an HSS 728 through an S6a interface.

In the NG network, the control plane and the user plane may be separated, which may permit independent scaling and distribution of the resources of each plane. The UE 702 may be connected to an Access and Mobility Function (AMF) 742 of the NG CN. The NG CN may contain multiple network functions besides the AMF 712. These functions may include a User Plane Function (UPF) 746, a Session Management Function (SMF) 744, a Policy Control Function (PCF) 732, an Application Function (AF) 720, an Authentication Server Function (AUSF) 740 and User Data Management (UDM) 728. The various elements may be connected by the reference points shown in FIG. 7. At least some of functionality of the EPC and the NG CN may be shared. Alternatively, separate components may be used for each of the combined component shown.

The AMF 712 may provide mobility-related functionality similar to that of the MME 722. This functionality may include UE-based authentication, authorization and mobility management, for example. The AMF 712 may be independent of the access technologies. The SMF 714 and UPF 706 may split the NG control and user functionality of the PGW 726. The SMF 714 may be responsible for session management and allocation of IP addresses to the UE 702. The SMF 714 may also select and control the UPF 706 for data transfer, including the establishment of filters in the UPF 706.

The SMF 714 may be associated with a single session of the UE 702 or multiple sessions of the UE 702. This is to say that the UE 702 may have multiple NG sessions. In some embodiments, different SMFs may be allocated to each session. The use of different SMFs may permit each session to be individually managed. As a consequence, the functionalities of each session may be independent of each other. The UPF 746 may be connected with a data network, with which the UE 702 may communicate, the UE 702 transmitting uplink data to or receiving downlink data from the data network.

The AF 720 may provide information on the packet flow to the PCF 732 responsible for policy control to support a desired QoS. The AF 720 may send service requests and CODEC (Coding-Decoding, or Compression-Decompression) parameters to a Policy and Charging Rules function (PCRF) 732. The PCF 732 may set mobility and session management policies for the UE 702. To this end, the PCF 732 may use the packet flow information to determine the appropriate policies for proper operation of the AMF 742 and SMF 744. The AUSF 740 may store data for UE authentication.

The UDM 728 (which may be shared with the HSS) may similarly store the UE subscription data. The UDM 728 may be connected to the AMF 742 through the N8 interface. The SGW 724 may connected with the PGW 726 through an S5 interface (control plane PGW-C through S5-C and user plane PGW-U through S5-U). The PGW 726 may serve as an IP anchor for data through the internet.

The eNB 710 and gNB 730 may communicate data with the SGW 724 of the EPC and the UPF 746 of the NG CN. The MME 722 and the AMF 742 may be connected via the N26 interface to provide control information therebetween, if the N26 interface is supported by the EPC. The PCF and PCRF 732 may be combined and connected to the AMF 742 through the N15 interface.

Figure 8:
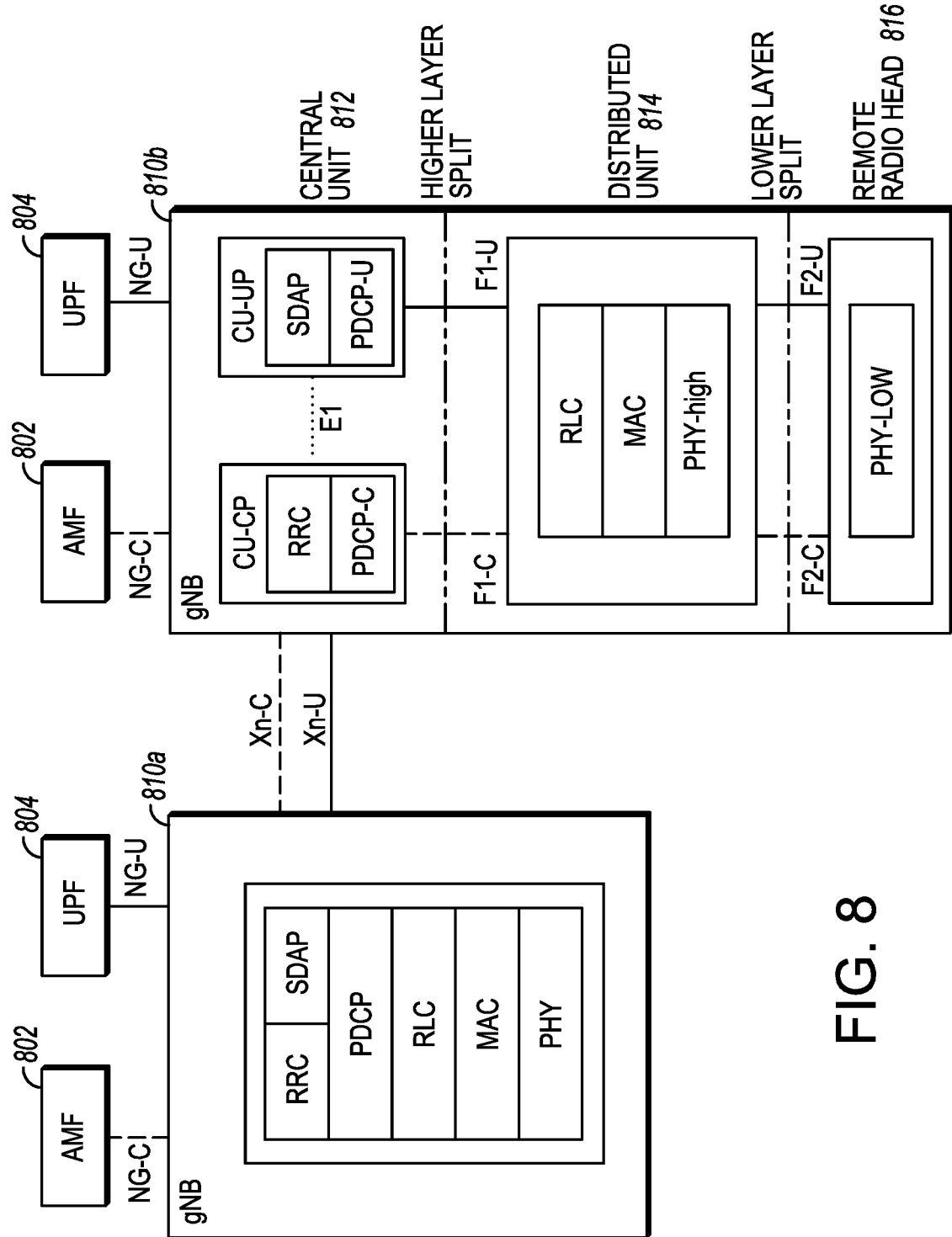
FIG. 8 illustrates interconnections for gNBs in accordance with some embodiments.

The UE may be able to take advantage of a dual-connectivity (DC) framework, in which the UE may be connected simultaneously with a master NodeB (MNB) and a secondary NodeB (SNB). The MNB and SNB may be eNBs, gNBs, or a combination thereof, for example. In some embodiments, the MNB may use a single SNB for a bearer associated with the UE. In some embodiments, the MNB may service the UE, so that all UL and DL data flow associated with the bearer is controlled by the MNB. For example, the MNB may transmit packets to the SNB for delivery to the UE. The SNB may provide the MNB with information about packet transmission or delivery to permit the MNB to control packet flow to the SNB to avoid overflow or underflow buffer issues associated with packet delivery to the UE. The packet and control flow may be transmitted over an X2 interface when the MNB and SNB are eNBs over an Xn interface when the MNB and SNB are gNBs (although a combination of eNB and gNB may be used as well). FIG. 8 illustrates interconnections for gNBs in accordance with some embodiments.

As shown in FIG. 8, the gNBs 810a, 810b are each connected with different AMFs 802 and UPFs 804 through an NG-Control plane (NG-C or, as indicated in FIG. 7, N2) interface and an NG-User plane (NG-U or, as indicated in FIG. 7, N3) interface, respectively. The gNBs 810a, 810b may be connected with each other via dual Xn interfaces for control plane signaling (Xn-C) and user plane signaling (Xn-U). The control plane functions of the Xn-C interface may include interface management and error handling functionality, connected mode mobility management, support of RAN paging and dual connectivity functions, among others. Examples of the interface management and error handling functionality include setup, reset, removal and configuration update of the Xn interface. Examples of connected mode mobility management include handover procedures, sequence number status transfer and UE context retrieval. Examples of dual connectivity functions include secondary node addition, reconfiguration, modification, and release of the secondary node. The user plane functions of the Xn-U interface may include both data forwarding and flow control between the gNBs 810*a*, 810*b*.

Each of the gNBs 810*a*, 810*b* may implement protocol entities in the protocol stack shown in FIG. 5, in which the layers are considered to be ordered, from lowest to highest, in the order PHY, MAC, RLC, PDCP, and RRC/SDAP (for the control plane/user plane). The protocol layers in each gNB 810*a*, 810*b* may be distributed in different units—a Central Unit 812, at least one Distributed Unit 814, and a Remote Radio Head 816. The Central Unit 812 may provide functionalities such as the control the transfer of user data, and effect mobility control, radio access network sharing, positioning, and session management, except those functions allocated exclusively to the Distributed Unit 814.

In one particular embodiment, the higher protocol layers (PDCP and RRC for the control plane/PDCP and SDAP for the user plane) may be implemented in the Central Unit 812, and the RLC and MAC layers may be implemented in the Distributed Unit 814. The PHY layer may be split, with the higher PHY layer also implemented in the Distributed Unit 814, while the lower PHY layer is implemented in the Remote Radio Head 816. The Central Unit 812, Distributed Unit 814 and Remote Radio Head 816 may be implemented by different manufacturers, but may nevertheless be connected by the appropriate interfaces therebetween. The Central Unit 812 may be connected with multiple Distributed Units 814.

The interfaces within the gNB include the E1, and fronthaul (F) F1 and F2 interfaces. The E1 Interface may be between a Central Unit control plane and the Central Unit user plane and thus may support the exchange of signaling information between the control plane and the user plane. The E1 Interface may separate Radio Network Layer and Transport Network Layer and enable exchange of UE associated information and non-UE associated information. The F1 interface may be disposed between the Central Unit 812 and the Distributed Unit 814. The Central Unit 812 may control the operation of the Distributed Unit 814 over the F1 interface.

As the signaling in the gNB is split into control plane and user plane signaling, the F1 interface may be split into the F1-C interface for control plane signaling and the F1-U interface for user plane signaling, which support control plane and user plane separation. The F1 interface, as above may separate the Radio Network and Transport Network Layers and enable exchange of UE associated information and non-UE associated information.

The F2 interface may be between the lower and upper parts of the NR PHY layer. The F2 interface may also be separated into F2-C and F2-U interfaces based on control plane and user plane functionalities.

Flow control for RAN interfaces was introduced as a Downlink (DL) Data Delivery Status (DDDS) message and extended with the addition of a DL DDDS Extended message to accommodate larger PDCP sequence numbers. A similar mechanism may be used for LTE-WLAN Aggregation (LWA) through the Xw interface—the logical interface between the eNB and the WLAN Termination (WT). However, there are a number of differences between the X2, Xw and Xn interfaces, leading to a desire to develop a flexible flow control mechanism that are able to be used on multiple interfaces and can be extended in the future, to support new interfaces and new functionality—rather than using different flow control mechanisms for the different interfaces. It may be further desirable for such a flexible flow control mechanism to support the presence of optional information.

Various embodiments may enable the above flexible flow control mechanism, which may be used with at least the X2, Xw, Xn and F1/F2 interfaces. Specifically, different DDDS frame structures may be used, depending on the embodiment. In a first embodiment, the DDDS frame structure may be expanded to add a sufficient number of spare bytes to allow optional fields to be indicated by a separate bit. In such an embodiment, a semantic description of fields (e.g. sequence numbers) may be generalized to accommodate different interfaces. In a second embodiment, Abstract Syntax Notation One (ASN.1) may be adopted for the DDDS frame structure. In a third embodiment, the type-length-value (TLV) (also known as tag-length-value) approach may be adopted for the DDDS message.

Figure 9:
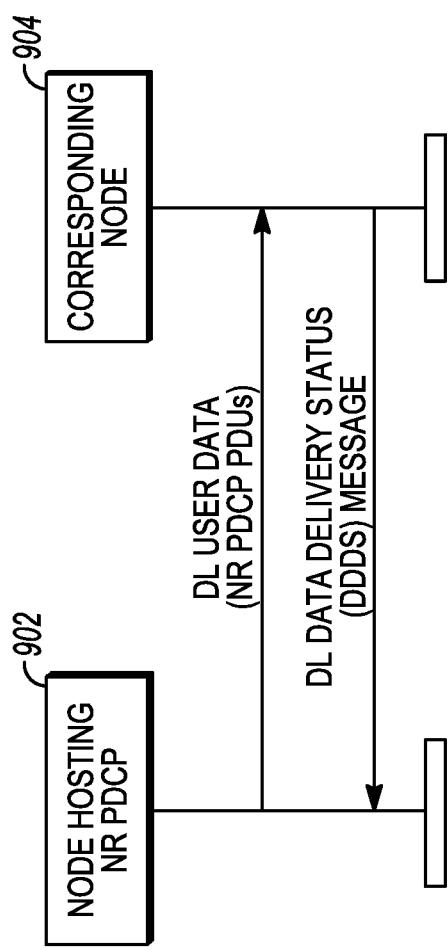
FIG. 9 illustrates information flow between nodes in accordance with some embodiments.

FIG. 9 illustrates information flow between nodes in accordance with some embodiments. As shown, the node hosting the NR PDCP entity (i.e., the transmitting node/node transmitting the NR PDCP PDUs) 902 may transmit DL data for the UE to the corresponding node (i.e., the receiving node/node receiving the NR PDCP PDUs) 904 for transmission to the UE on the corresponding bearer. In response, the corresponding node 904 may transmit a DDDS message having a particular frame format to the transmitting node 902. In the first embodiment, a DL DDS (PDU Type 1) frame format may be defined to transfer feedback in a DDDS message to allow the transmitting node 902 to control the downlink user data flow via the corresponding node 904.

| | | | Bits | | | | Number of Octets |
|---|---|---|---|---|---|---|---|
| 7 | 6 | 5 | 4 | 3 | 2 | 1 | 0 | |
| PDU Type (=1) | | | | Highest PDCP Transmitted Ind | Highest PDCP Delivered Ind | Final Frame Ind. | Lost Packet Report | 1 |
| | | | | | Spare | | | 1 |
| | | | | | Spare | | | 1 |
| Highest successfully delivered PDCP Sequence Number | | | | | | | | 3 |
| Highest transmitted PDCP Sequence Number | | | | | | | | 3 |
| Desired buffer size for the data bearer | | | | | | | | 4 |
| Minimum desired buffer size for the UE | | | | | | | | 4 |
| Number of lost NG-RAN-U Sequence Number ranges reported | | | | | | | | 1 |
| Start of lost NG-RAN-U Sequence Number range | | | | | | | | 6* |
| End of lost NG-RAN-U Sequence Number range | | | | | | | | (Number |

| 7 | 6 | 5 | 4 | 3 | Bits 2 | 1 | 0 | Number of Octets |
|---|---|---|---|---|---|---|---|---|
| | | | | | | | | of reported lost 5G-U SNranges) |
| | | | | Spare extension | | | | 1-7 |

DDDS Format

The DDDS frame format contains a number of octets which each provide different information. The first octet contains 4 bits to indicate the PDU type (e.g., 0 for user data, 1 for the DDDS, 2 for assistance information data). The highest PDCP transmitted indicator parameter indicates the presence of the highest transmitted PDCP Sequence Number (0=not present, 1=present) in a later set of octets. The highest transmitted PDCP Sequence Number field may be several (e.g., 3) octets, if present, and may provide feedback about the transmitted status of the PDCP PDU sequence at the corresponding node (gNB) to the lower layers.

The highest PDCP delivered indicator parameter in the first octet indicates the presence of the highest successfully delivered PDCP Sequence Number (0=not present, 1=present). The highest successfully delivered PDCP sequence number may be several (e.g., 3) octets, if present, and may provide feedback about the in-sequence delivery status of PDCP PDUs at the corresponding node (gNB) towards the UE. The highest successfully delivered PDCP sequence number field may occur, as shown, in the octets immediately preceding the highest transmitted PDCP Sequence Number field.

The final frame indicator indicates whether the frame is the last DL status report (0=not the final frame, 1=final frame). That is that the received frame is the last DL status report received while a bearer is being released from the corresponding node and thus the corresponding node knows that the bearer will be released before the DL status report is signaled. When the indication indicates the last frame, the node hosting the PDCP entity may consider that no more UL or DL data is expected to be transmitted between the corresponding node and the UE. The lost packet report parameter indicates the presence of the number of lost Sequence Number ranges reported and the start and end of the lost sequence number range (0=not present, 1=present).

Multiple (e.g. 4) octets in the DDDS frame may also be reserved to indicate the desired buffer size for the radio data bearer for the UE. In some cases, if the buffer size is 0, the hosting node may stop sending data for the UE per bearer; if the value is greater than 0, the hosting node may send up to the amount of data per bearer beyond the Highest Delivered or Transmitted PDCP Sequence Number—e.g., dependent on the delivery mode (acknowledged or unacknowledged). The data rate may also be provided in a separate field.

Additionally, up to a single octet may be used to convey the number of lost NG-RAN-U Sequence Number ranges. The number of lost NG-RAN-U Sequence Number ranges reported parameter may be present, in some cases if a lost packet report indication is included in the DDDS frame. If lost NG-RAN-U Sequence Number ranges are reported, up to 6 octets in the DDDS frame may be used to indicate the start and end of the lost NG-RAN-U Sequence Number range reported to be lost. In some cases, each of the start and end of the lost NG-RAN-U Sequence Number range may occupy 3 octets, if present.

One or more octets or portion of octets may be reserved as a spare field (or extension). The spare field may be used in future DDDS frames (i.e., reserved for later versions). The spare field, for example, may be used to provide additional indicators that indicate whether other fields in the DDDS frame are present. Thus, for example, data in one or more fields in the DDDS frame which have previously been non-optional (such as the highest transmitted or successfully delivered PDCP Sequence Number) may now be optional (i.e., not included in the DDDS frame if indicated as such). The spare field may be set to 0 by the sender, in which case the receiver may avoid interpreting the spare field. Similarly, when one or more additional indicators are used in the spare field, if a particular indicator in the spare field indicates the absence of data in a later optional field, the receiver may avoid interpreting the later optional field as this data may be set to 0 (or may not be included). In addition, the spare fields may also be used to add padding to ensure that the NR user plane protocol PDU length (including padding and any future extension) is (n*4−2) octets, where n is a positive integer. In some embodiments, at least a portion of the second and/or third octet may contain a spare field.

The DDDS frame above may have additional fields not discussed. The DDDS format may be flexible—for example, when the protocol is used on the Xn interface, the NR PDCP Sequence Number may be used for the highest PDCP transmitted and delivered indicator; when the protocol is used on the X2 interface, the LTE PDCP Sequence Number may be used.

The DDDS message may thus be used to transfer DL user data between RAN nodes for a single data radio bearer only per instance. To this end, specific sequence number information at the transfer of user data carrying, for example, a DL NR PDCP PDU, may be provided from the node hosting the NR PDCP entity to the corresponding node. The node hosting the NR PDCP entity (the transmitting node) may assign consecutive NR-U sequence numbers to each transferred NR-U PDU. The receiving node may detect whether an NR-U packet was lost and determine the respective sequence number after the receiving node has determined that the respective NR-U packet is lost. The receiving node may transfer the remaining NR PDCP PDUs towards the UE and determine the highest NR PDCP PDU sequence number of the NR PDCP PDU that was successfully delivered in sequence towards the UE (when RLC Acknowledged Mode (AM) is used) and the highest NR PDCP PDU sequence number of the NR PDCP PDU that was transmitted to the lower layers. The receiving node may send the DDDS message if the Report Polling Flag is set, unless a situation of overload at the corresponding node is encountered. The transmitting node may indicate to the receiving node whether a particular NR-U packet is a retransmission of a NR PDCP PDU. The transmitting node can indicate to the receiving node to either discard all NR PDCP PDUs up to and including a defined DL discard NR PDCP PDU SN or discard one or a number of blocks of downlink NR PDCP PDUs.

In further embodiments, the spare field in the second octet may be used to provide a data rate indicator, the Highest Delivered Retransmitted or Highest Retransmitted PDCP Sequence Number indicators, and a cause report indicator. The data rate indicator may be used to indicate whether the data rate (the amount of data desired to be received in bytes in a specific amount of time (e.g., 1 s)) for a specific data radio bearer established for the UE is included in the DDDS frame. The data rate may be 4 octets in length. The cause report indicator may be used to indicate whether the cause value for the DDDS frame is present in the DDDS frame. The cause value may be 1 octet in length and may take values that indicate the occurrence of an event such as radio link outage/resumption or UL/DL radio link outage/resumption. The Highest Delivered Retransmitted or Highest Retransmitted PDCP Sequence Number indicator may be used to indicate whether Highest Delivered Retransmitted or Highest Retransmitted PDCP Sequence Number is respectfully included in the DDDS frame. The Highest Delivered Retransmitted or Highest Retransmitted PDCP Sequence Number may each be 3 octets and may be similar to the Highest Delivered or Highest Transmitted PDCP Sequence Number, with the retransmission PDCP SN replacing the PDCP SN.

In another embodiment, ASN.1 may be adopted for DDDS as NG-RAN network nodes support ASN.1 functionality. In the above DDDS format embodiment, each parameter may have different lengths dependent on PDU type. For example, the highest successfully delivered PDCP sequence number can be either 12 bits or 15 bits or 18 bits, depending on the bearer configuration. This DDDS format may thus use entirely separate frames with different PDU types. On the other hand, the same message can be still used in ASN.1 with e.g. a choice type description.

| IE/Group Name | Presence | Range | IE type and reference | Semantics description | Criticality | Assigned Criticality |
|---|---|---|---|---|---|---|
| Message Type | M | | | | YES | reject |
| Final Frame Indicator | O | | BIT STRING (1) | This parameter indicates whether the message is the last DL status report | YES | reject |
| Highest successfully delivered PDCP SN | O | | PDCP SN Length Type (see below) | This parameter indicates feedback about the in-sequence delivery status of PDCP PDUs at the node transmitting this message towards the UE | YES | reject |
| Highest transmitted PDCP SN | O | | PDCP SN Length Type (see below) | This parameter indicates feedback about PDCP PDUs transferred to RLC at the node transmitting this message | YES | reject |
| Desired buffer size for the data bearer | O | | OCTET STRING (4) | This parameter indicates the desired buffer size for the concerned bearer | YES | reject |
| Minimum desired buffer size for the UE | O | | OCTET STRING (4) | This parameter indicates the minimum desired buffer size for all bearers established for the UE | YES | reject |
| Lost NG-RAN-U Sequence Number List | | 0 . . . <maxnoofLostNGRANUlist> | | This list indicates the number of NG-RAN-U Sequence Number ranges reported to be lost | YES | reject |
| >Lost NG-RAN-U Sequence Number Range Item | | | | | EACH | reject |
| >>Start | M | | OCTET STRING (3) | This parameter indicates the start of an NG-RAN-U sequence number range | | |
| >>End | M | | OCTET STRING (3) | This parameter indicates the end of an NG-RAN-U sequence number range | | |

PDCP SN Length Type

| IE/Group Name | Presence | Range | IE Type and Reference | Semantics Description |
|---|---|---|---|---|
| CHOICE PDCP SN Length Type | M | | | |
| >12 bits | | | | |
| >>PDCP Sequence Number | M | | BIT STRING (SIZE (12)) | |
| >15bits | | | | |
| >>PDCP Sequence Number | M | | BIT STRING (SIZE (15)) | |
| >18 bits | | | | |
| >>PDCP Sequence Number | M | | BIT STRING (SIZE (18)) | |

In some embodiments, a TLV approach may be adopted for the DDDS message. In this case, the message may be a sequence of type-length-value triples for each parameter. Unlike the ASN.1 embodiment, the TLV embodiment may avoid use of a choice type description to support and differentiate different lengths within a parameter.

| Name | Type | Length | Semantics description |
|---|---|---|---|
| Final Frame Indicator | 1 | BIT STRING | |
| Highest successfully delivered PDCP SN | 2 | Either BIT STRING (12) or BIT STRING (15) or BIT STRING (18) | |
| Highest transmitted PDCP SN | 3 | Either BIT STRING (12) or BIT STRING (15) or BIT STRING (18) | |
| Desired buffer size for the data bearer | 4 | OCTET STRING | |
| Minimum desired buffer size for the UE | 5 | OCTET STRING | |
| Lost NG-RAN-U Sequence Number List | 6 | | |
| Spare | 7-32 | | |

TLV DDDS Format

As shown, the "Length" field, which follows the "Type" field may directly indicate the length of the indicator, thereby permitting flexibility in the DDDS format. Although not shown explicitly, the list of lost sequence numbers may be signaled as pairs (of fixed length) of start and end sequence numbers.

In some embodiments, the Length field above can be omitted for a specific type, if specified in that manner. For example, the highest successfully delivered PDCP SN, which can be either 12 bits or 15 bits or 18 bits (or may be more than 18 bits in the future), can be supported without the Length field, if separate types are defined for each length as below:

| Name | Type | Length | Semantics description |
|---|---|---|---|
| Final Frame Indicator | 1 | BIT STRING | |
| Highest successfully delivered PDCP SN 12 bits | 2 | Omitted | |
| Highest successfully delivered PDCP SN 15 bits | 3 | Omitted | |
| Highest successfully delivered PDCP SN 18 bits | 4 | Omitted | |
| Highest transmitted PDCP SN 12 bits | 5 | Omitted | |
| Highest transmitted PDCP SN 15 bits | 6 | Omitted | |
| Highest transmitted PDCP SN 18 bits | 7 | Omitted | |
| Desired buffer size for the data bearer | 8 | OCTET STRING | |
| Minimum desired buffer size for the UE | 9 | OCTET STRING | |
| Lost NG-RAN-U Sequence Number List | 10 | | |
| Spare | 11-32 | | |

TLV DDDS Format 2

Independent of the format used for the DDDS frame, the DDDS frame may provide feedback from the receiving node to the transmitting node to allow the transmitting node to control the DL user data flow via the receiving node for the respective data radio bearer, as well as to control the successful delivery of DL control data to the receiving node. The receiving node may also transfer UL user data for the data radio bearer to the transmitting node together with a DDDS frame within the same GTP-U PDU. The DDDS frame may be generated, as other operations of the RAN nodes described herein, by one or more processors of the RAN node executing instructions in a non-transitory computer-readable storage medium that stores the instructions.

When the receiving node determines that the DDDS message is to be transmitted to the transmitting node, the DDDS message may include the highest NR PDCP PDU sequence number successfully delivered in sequence to the UE among those NR PDCP PDUs received from the transmitting node when RLC AM is used. The highest NR PDCP PDU sequence number may exclude retransmission NR PDCP PDUs. The DDDS message may also include the desired buffer size in bytes for the data radio bearer associated with the DDDS message and may contain a minimum buffer size in bytes for the data radio bearer associated with the DDDS message. The DDDS message may further include the NR-U packets that were declared as being lost by the receiving node and have not yet been reported to the transmitting node within the DDDS message and the highest NR PDCP PDU sequence number transmitted to the lower layers among those NR PDCP PDUs received from the transmitting node (excluding retransmission NR PDCP PDUs). The lost NR-U packet information may include the number of lost NR PDCP PDU sequence number ranges, as well as the start and end of the NR PDCP PDU sequence number range.

Prior to transmission of the DDDS message, the receiving node may detect whether the UE has initiated a successful RACH access for the data bearer, after which the receiving node may transmit an initial DDDS message to the transmitting node. The DDDS message may be associated with the bearer. In some cases, the transmitting node may start sending DL data before receiving the initial DDDS message. When the DDDS message is sent before any NR PDCP PDU is transferred to lower layers, the information on the highest NR PDCP PDU sequence number successfully delivered in sequence to the UE and the highest NR PDCP PDU sequence number transmitted to the lower layers may not be provided.

The DDDS message may also include a final frame that indicates whether the frame is the last DL status report received in the course of releasing a bearer from the receiving node. The final frame indication may be signaled when the receiving node knows that the bearer will be released before the DL status report is signaled. When the DDDS message contains the final frame indication, the transmitting node may determine that that no further UL or DL data is expected to be transmitted between the receiving node and the UE.

The transmitting node, after receiving the DDDS message, may determine from the desired buffer size field the amount of data to be sent. If the value of the desired buffer size is 0, the transmitting node may terminate data transmission on the bearer. If the value of the desired buffer size is greater than 0, the transmitting node may send up to the amount of data indicated per bearer beyond the highest successfully delivered NR PDCP SN (for RLC AM) or the highest transmitted NR PDCP SN (for RLM UM). The information of the buffer size may be valid until the next DDDS message is received by the transmitting node. The transmitting node may remove buffered NR PDCP PDUs dependent on the feedback of transmitted and/or successfully delivered NR PDCP PDUs in the DDDS message, as well as determining what actions to take for NR PDCP PDUs reported other than those reported transmitted and/or successfully delivered (e.g., retransmission or removal from the buffer). For RLC AM, after the highest NR PDCP PDU sequence number successfully delivered in sequence is reported to the transmitting node, the receiving node may remove the respective NR PDCP PDUs. For RLC UM, the receiving node may remove the respective NR PDCP PDUs after transmission to lower layers.

EXAMPLES

Example 1 is an apparatus of a next generation radio access network (NG-RAN) node, the apparatus comprising: a memory; and processing circuitry arranged to: determine that downlink (DL) new radio (NR) packet data convergence protocol (PDCP) packet data units (PDUs) for a user equipment (UE) are to be transmitted to another NG-RAN node for transmission to the UE; generate, for transmission to the other NG-RAN node over an Xn-User plane (Xn-U) interface, the DL NR PDCP PDUs for transmission to the UE; extract from a downlink Data Delivery Status (DDDS) frame received from the other NG-RAN node in response to transmission of the DL NR PDCP PDUs to the other NG-RAN node: a highest delivered PDCP Sequence Number (SN) indicator parameter indicating a presence in the DDDS frame of a SN of a highest successfully delivered DL NR PDCP PDU, of the DL NR PDCP PDUs, that is successfully delivered to the UE, and a highest successfully delivered PDCP SN parameter that provides the SN of the highest successfully delivered DL NR PDCP PDU, when indicated to be present by the highest successfully delivered PDCP SN indicator parameter; and instruct the memory to remove a set of stored DL NR PDCP PDUs of DL NR PDCP PDUs indicated by the DDDS frame as at least one of transmitted or successfully delivered DL NR PDCP PDUs, wherein the DDDS frame is usable for both X2 interface DDDS messages and Xn interface DDDS messages.

In Example 2, the subject matter of Example 1 includes, wherein: the DDDS frame further comprises a PDU type parameter that indicates a type of the DDDS frame, a final frame indicator parameter that indicates whether the DDDS frame is a final DL status report before release of a bearer corresponding to the DDDS frame, a highest PDCP transmitted indicator parameter that indicates a presence in the DDDS frame of a SN of a highest transmitted DL NR PDCP PDU, of the DL NR PDCP PDUs, that is transmitted to the UE, and a lost packet report parameter that indicates whether a number of lost SN ranges reported and a start and end of a lost SN range is present in the DDDS frame, and the highest delivered PDCP SN indicator parameter, the highest transmitted PDCP SN parameter, the PDU type parameter, the final frame indicator parameter and the lost packet report parameter are provided in a first octet of the DDDS frame.

In Example 3, the subject matter of Example 2 includes, wherein the highest delivered PDCP SN indicator parameter, the highest transmitted PDCP SN parameter, the final frame indicator parameter and the lost packet report parameter are each a single bit and the PDU type parameter is multiple bits.

In Example 4, the subject matter of Examples 1-3 includes, by the NG-RAN node, the spare field reserved for later versions of DDDS frames.

In Example 5, the subject matter of Examples 1-4 includes, wherein the DDDS frame further comprises: a highest transmitted PDCP SN field that provides feedback about a transmitted status of the PDCP PDU sequence to lower layers, a desired buffer size for a radio data bearer corresponding to the DDDS frame, a number of lost SN ranges, and a start and end of a lost SN range reported in the DDDS frame to be lost.

In Example 6, the subject matter of Example 5 includes, wherein: the desired buffer size occurs in the DDDS frame after a first octet, the number of lost SN ranges occurs in the DDDS frame after the desired buffer size, and the start and end of a lost SN range occurs in the DDDS frame after the number of lost SN ranges.

In Example 7, the subject matter of Examples 5-6 includes, wherein: the desired buffer size is 4 octets, the number of lost SN ranges is a single octet, and the start and end of a lost SN range are each up to 6 octets.

In Example 8, the subject matter of Examples 1-7 includes, wherein: the NG-RAN node comprises a central unit configured to control transfer of user data between the NG-RAN node and the other NG-RAN node, and effect mobility control, radio access network sharing, positioning, and session management for the UE, a distributed unit and a remote radio head (RRH), the central unit is connected with the distributed unit through a F1 interface, and the distributed unit connected with the RRH through an F2 interface.

In Example 9, the subject matter of Example 8 includes, wherein a physical layer (PHY) layer of the NG-RAN node is split between the distributed unit and the RRH to implement PHY high layer functionality in the distributed unit and PHY low layer functionality in the RRH.

In Example 10, the subject matter of Examples 8-9 includes, wherein: the central unit further comprises an E1 interface that supports a signaling information exchange between a control plane and a user plane of the central unit, the F1 interface comprises an F1-User plane (F1-U) interface for user plane signaling between the central unit and the distributed unit and an F1-Control plane (F1-C) interface for control plane signaling between the central unit and the distributed unit, and the F2 interface comprises an F2-U interface for user plane signaling between the distributed unit and the RRH and an F2-C interface for control plane signaling between the distributed unit and the RRH.

In Example 11, the subject matter of Examples 1-10 includes, wherein the processing circuitry comprises: a baseband processor configured to encode transmissions to, and decode transmissions from, the other NG-RAN node.

Example 12 is an apparatus of a next generation radio access network (NG-RAN) node, the apparatus comprising: processing circuitry arranged to: encode, for transmission to a user equipment (UE) on a radio bearer, downlink (DL) new radio (NR) packet data convergence protocol (PDCP) packet data units (PDUs) from another NG-RAN node over an Xn-User plane (Xn-U) interface; determine transmission characteristics of the DL NR PDCP PDUs; and in response to reception of the DL NR PDCP PDUs, generate feedback for transmission to the other NG-RAN node to allow the other NG-RAN node to control downlink user data flow via the NG-RAN node for the data radio bearer, the feedback comprising a downlink Data Delivery Status (DDDS) frame that comprises: a highest delivered PDCP Sequence Number (SN) indicator parameter indicating a presence in the DDDS frame of a SN of a highest successfully delivered DL NR PDCP PDU, of the DL NR PDCP PDUs, that is successfully delivered to the UE, and a highest successfully delivered PDCP SN parameter that provides the SN of the highest successfully delivered DL NR PDCP PDU, the highest successfully delivered PDCP SN parameter containing 0 when the highest delivered PDCP SN indicator parameter that indicates that the highest successfully delivered PDCP SN is not present and containing a non-zero number when the highest delivered PDCP SN indicator parameter that indicates that the highest successfully delivered PDCP SN is present; and a memory arranged to store the DL NR PDCP PDUs prior to transmission to the UE.

In Example 13, the subject matter of Example 12 includes, wherein: the DDDS frame further comprises a PDU type parameter that indicates a type of the DDDS frame, a final frame indicator parameter that indicates whether the DDDS frame is a final DL status report before release of a bearer corresponding to the DDDS frame, a highest PDCP transmitted indicator parameter that indicates a presence in the DDDS frame of a SN of a highest transmitted DL NR PDCP PDU, of the DL NR PDCP PDUs, that is transmitted to the UE, and a lost packet report parameter that indicates whether a number of lost SN ranges reported and a start and end of a lost SN range is present in the DDDS frame, and the highest delivered PDCP SN indicator parameter, the highest transmitted PDCP SN parameter, the PDU type parameter, the final frame indicator parameter and the lost packet report parameter are provided in a first octet of the DDDS frame.

In Example 14, the subject matter of Example 13 includes, wherein the highest delivered PDCP SN indicator parameter, the highest transmitted PDCP SN parameter, the final frame indicator parameter and the lost packet report parameter are each a single bit and the PDU type parameter is multiple bits.

In Example 15, the subject matter of Examples 12-14 includes, by the NG-RAN node, the spare field reserved for later versions of DDDS frames.

In Example 16, the subject matter of Examples 12-15 includes, wherein the DDDS frame further comprises: a highest transmitted PDCP SN field that provides feedback about a transmitted status of the PDCP PDU sequence to lower layers at the NG-RAN node, a desired buffer size for a radio data bearer corresponding to the DDDS frame, a number of lost SN ranges, and a start and end of a lost SN range reported in the DDDS frame to be lost.

In Example 17, the subject matter of Example 16 includes, wherein: the desired buffer size occurs in the DDDS frame after a first octet, the number of lost SN ranges occurs in the DDDS frame after the desired buffer size, and the start and end of a lost SN range occurs in the DDDS frame after the number of lost SN ranges.

In Example 18, the subject matter of Examples 16-17 includes, wherein: the desired buffer size is 4 octets, the number of lost SN ranges is a single octet, and the start and end of a lost SN range are up to 6 octets.

Example 19 is a non-transitory computer-readable storage medium that stores instructions for execution by one or more processors of a next generation radio access network (NG-RAN) node, the one or more processors to configure the NG-RAN node to, when the instructions are executed: transmit, to another NG-RAN node over an Xn-User plane (Xn-U) interface, downlink (DL) new radio (NR) packet data convergence protocol (PDCP) packet data units (PDUs) for a user equipment (UE) for transmission by the other NG-RAN to the UE on a data radio bearer; receive feedback from the other NG-RAN node to allow the NG-RAN node to control downlink user data flow for the data radio bearer, the feedback comprising a downlink Data Delivery Status (DDDS) frame that comprises: a highest delivered PDCP Sequence Number (SN) indicator parameter indicating a presence in the DDDS frame of a SN of a highest successfully delivered DL NR PDCP PDU, of the DL NR PDCP PDUs, that is successfully delivered to the UE, and a highest successfully delivered PDCP SN parameter that provides the SN of the highest successfully delivered DL NR PDCP PDU, the highest successfully delivered PDCP SN parameter containing 0 when the highest delivered PDCP SN indicator parameter that indicates that the highest successfully delivered PDCP SN is not present and containing a non-zero number when the highest delivered PDCP SN indicator parameter that indicates that the highest successfully delivered PDCP SN is present; and remove buffered DL NR PDCP PDUs of DL NR PDCP PDUs reported by the DDDS message as at least one of transmitted or successfully delivered DL NR PDCP PDUs.

In Example 20, the subject matter of Example 19 includes, wherein: the DDDS frame further comprises a PDU type parameter that indicates a type of the DDDS frame, a final frame indicator parameter that indicates whether the DDDS frame is a final DL status report before release of a bearer corresponding to the DDDS frame, a highest PDCP transmitted indicator parameter that indicates a presence in the DDDS frame of a SN of a highest transmitted DL NR PDCP PDU, of the DL NR PDCP PDUs, that is transmitted to the UE, and a lost packet report parameter that indicates whether a number of lost SN ranges reported and a start and end of a lost SN range is present in the DDDS frame, the highest delivered PDCP SN indicator parameter, the highest transmitted PDCP SN parameter, the PDU type parameter, the final frame indicator parameter and the lost packet report parameter are provided in a first octet of the DDDS frame, and the highest delivered PDCP SN indicator parameter, the highest transmitted PDCP SN parameter, the final frame indicator parameter and the lost packet report parameter are each a single bit and the PDU type parameter is multiple bits.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus of a first base station, the apparatus comprising:
   a memory; and
   processing circuitry arranged to:
      determine that downlink (DL) packet data convergence protocol (PDCP) packet data units (PDUs) for a user equipment (UE) are to be transmitted to a second base station for transmission to the UE;
      generate, for transmission to the second base station over an interface, the DL PDCP PDUs for transmission to the UE;
      extract from a downlink Data Delivery Status (DDDS) frame received from the second base station:
         a highest delivered PDCP Sequence Number (SN) indicator parameter indicating a presence in the DDDS frame of a SN of a highest successfully delivered DL PDCP PDU, of the DL NR PDCP PDUs, that is successfully delivered to the UE; and
         a highest successfully delivered PDCP SN parameter that provides the SN of the highest successfully delivered DL PDCP PDU, when indicated to be present by the highest successfully delivered PDCP SN indicator parameter; and
      instruct the memory to remove a set of stored DL PDCP PDUs of DL PDCP PDUs indicated by the DDDS frame as at least one of transmitted or successfully delivered DL PDCP PDUs.

2. The apparatus of claim 1,
wherein the DDDS frame is usable for both X2 interface DDDS messages and Xn-interface DDDS messages.

3. The apparatus of claim 1,
wherein the interface comprises one of:
   an Xn-User plane (Xn-U) interface; or
   an X2-User plane (X2-U) interface.

4. The apparatus of claim 1,
wherein successfully delivered DL PDCP PDUs comprise DL PDCP PDUs that are delivered in-sequence.

5. The apparatus of claim 1, wherein:
the DDDS frame further comprises a PDU type parameter that indicates a type of the DDDS frame, a final frame indicator parameter that indicates whether the DDDS frame is a final DL status report before release of a bearer corresponding to the DDDS frame, a highest PDCP transmitted indicator parameter that indicates a presence in the DDDS frame of a SN of a highest transmitted DL PDCP PDU, of the DL PDCP PDUs, that is transmitted to the UE, and a lost packet report parameter that indicates whether a number of lost SN ranges reported and a start and end of a lost SN range is present in the DDDS frame, and
the highest delivered PDCP SN indicator parameter, the highest transmitted PDCP SN parameter, the PDU type parameter, the final frame indicator parameter and the lost packet report parameter are provided in a first octet of the DDDS frame.

6. The apparatus of claim 5, wherein the highest delivered PDCP SN indicator parameter, the highest transmitted PDCP SN parameter, the final frame indicator parameter and the lost packet report parameter are each a single bit and the PDU type parameter is multiple bits.

7. An apparatus of a second base station, the apparatus comprising:
   processing circuitry arranged to:
      encode, for transmission to a user equipment (UE) on a radio bearer, downlink (DL) packet data convergence protocol (PDCP) packet data units (PDUs) from a first base station over an interface;
      determine transmission characteristics of the DL PDCP PDUs; and
      generate feedback for transmission to the first base station to allow the first base station to control downlink user data flow via the second base station for the data radio bearer, the feedback comprising a downlink Data Delivery Status (DDDS) frame that comprises:
         a highest delivered PDCP Sequence Number (SN) indicator parameter indicating a presence in the DDDS frame of a SN of a highest successfully delivered DL PDCP PDU, of the DL PDCP PDUs, that is successfully delivered to the UE, and
         a highest successfully delivered PDCP SN parameter that provides the SN of the highest successfully delivered DL PDCP PDU, when indicated to be present by the highest successfully delivered PDCP SN indicator parameter; and
   a memory arranged to store the DL PDCP PDUs prior to transmission to the UE.

8. The apparatus of claim 7,
wherein the DDDS frame is usable for both X2 interface DDDS messages and Xn-interface DDDS messages.

9. The apparatus of claim 7,
wherein the interface comprises one of:
   an Xn-User plane (Xn-U) interface; or
   an X2-User plane (X2-U) interface.

10. The apparatus of claim 7,
wherein successfully delivered DL PDCP PDUs comprise DL PDCP PDUs that are delivered in-sequence.

11. The apparatus of claim 7, wherein:
the DDDS frame further comprises a PDU type parameter that indicates a type of the DDDS frame, a final frame indicator parameter that indicates whether the DDDS frame is a final DL status report before release of a bearer corresponding to the DDDS frame, a highest PDCP transmitted indicator parameter that indicates a presence in the DDDS frame of a SN of a highest transmitted DL PDCP PDU, of the DL PDCP PDUs, that is transmitted to the UE, and a lost packet report parameter that indicates whether a number of lost SN ranges reported and a start and end of a lost SN range is present in the DDDS frame, and
the highest delivered PDCP SN indicator parameter, the highest transmitted PDCP SN parameter, the PDU type parameter, the final frame indicator parameter and the lost packet report parameter are provided in a first octet of the DDDS frame.

12. The apparatus of claim 7, wherein the highest delivered PDCP SN indicator parameter, the highest transmitted PDCP SN parameter, the final frame indicator parameter and the lost packet report parameter are each a single bit and the PDU type parameter is multiple bits.

13. The apparatus of claim 7, wherein the DDDS frame further comprises:
a highest transmitted PDCP SN field that provides feedback about a transmitted status of the PDCP PDU sequence to lower layers at the second base station,
a desired buffer size for a radio data bearer corresponding to the DDDS frame,
a number of lost SN ranges, and
a start and end of a lost SN range reported in the DDDS frame to be lost.

14. The apparatus of claim 13, wherein:
the desired buffer size occurs in the DDDS frame after a first octet,
the number of lost SN ranges occurs in the DDDS frame after the desired buffer size, and
the start and end of a lost SN range occurs in the DDDS frame after the number of lost SN ranges.

15. The apparatus of claim 13, wherein:
the desired buffer size is 4 octets,
the number of lost SN ranges is a single octet, and
the start and end of a lost SN range are up to 6 octets.

16. A non-transitory computer-readable storage medium that stores instructions for execution by one or more processors of a second base station, wherein the one or more processors are configured to execute the instructions to cause the second base station to:
encode, for transmission to a user equipment (UE) on a radio bearer, downlink (DL) packet data convergence protocol (PDCP) packet data units (PDUs) from a first base station over an interface;
determine transmission characteristics of the DL PDCP PDUs; and
generate feedback for transmission to the first base station to allow the first base station to control downlink user data flow via the second base station for the data radio bearer, the feedback comprising a downlink Data Delivery Status (DDDS) frame that comprises:
a highest delivered PDCP Sequence Number (SN) indicator parameter indicating a presence in the DDDS frame of a SN of a highest successfully delivered DL PDCP PDU, of the DL PDCP PDUs, that is successfully delivered to the UE, and
a highest successfully delivered PDCP SN parameter that provides the SN of the highest successfully delivered DL PDCP PDU, when indicated to be present by the highest successfully delivered PDCP SN indicator parameter; and
a memory arranged to store the DL PDCP PDUs prior to transmission to the UE.

17. The non-transitory computer-readable storage medium of claim 16,
wherein the DDDS frame is usable for both X2 interface DDDS messages and Xn-interface DDDS messages.

18. The non-transitory computer-readable storage medium of claim 16,
wherein the interface comprises one of:
an Xn-User plane (Xn-U) interface; or
an X2-User plane (X2-U) interface.

19. The non-transitory computer-readable storage medium of claim 16,
wherein successfully delivered DL PDCP PDUs comprise DL PDCP PDUs that are delivered in-sequence.

20. The non-transitory computer-readable storage medium of claim 16, wherein:
the DDDS frame further comprises a PDU type parameter that indicates a type of the DDDS frame, a final frame indicator parameter that indicates whether the DDDS frame is a final DL status report before release of a bearer corresponding to the DDDS frame, a highest PDCP transmitted indicator parameter that indicates a presence in the DDDS frame of a SN of a highest transmitted DL PDCP PDU, of the DL PDCP PDUs, that is transmitted to the UE, and a lost packet report parameter that indicates whether a number of lost SN ranges reported and a start and end of a lost SN range is present in the DDDS frame,
the highest delivered PDCP SN indicator parameter, the highest transmitted PDCP SN parameter, the PDU type parameter, the final frame indicator parameter and the lost packet report parameter are provided in a first octet of the DDDS frame, and
the highest delivered PDCP SN indicator parameter, the highest transmitted PDCP SN parameter, the final frame indicator parameter and the lost packet report parameter are each a single bit and the PDU type parameter is multiple bits.

* * * * *